(12) United States Patent
Moreshet et al.

(10) Patent No.: US 7,113,945 B1
(45) Date of Patent: Sep. 26, 2006

(54) VIRTUAL STORAGE DEVICE THAT USES VOLATILE MEMORY

(75) Inventors: Hana Moreshet, Framingham, MA (US); Haim Kopylovitz, Newton, MA (US); Adi Ofer, Wellesley, MA (US); David Meiri, Cambridge, MA (US); Mark J. Halstead, Watertown, MA (US)

(73) Assignee: EMC Corporation, Hopkinton, MA (US)

( * ) Notice: Subject to any disclaimer, the term of this patent is extended or adjusted under 35 U.S.C. 154(b) by 595 days.

(21) Appl. No.: 10/396,800

(22) Filed: Mar. 25, 2003

Related U.S. Application Data

(63) Continuation-in-part of application No. 10/306,378, filed on Nov. 27, 2002, which is a continuation-in-part of application No. 10/120,016, filed on Apr. 10, 2002.

(51) Int. Cl.
*G06F 17/30* (2006.01)

(52) U.S. Cl. ............................... 707/8; 707/2; 707/100

(58) Field of Classification Search ............... 707/2–5, 707/200–205, 8, 100; 711/104, 113, 118, 711/1, 6; 718/1
See application file for complete search history.

(56) References Cited

U.S. PATENT DOCUMENTS

| | | | |
|---|---|---|---|
| 5,206,939 A | 4/1993 | Yanai et al. | |
| 5,475,608 A * | 12/1995 | Masuoka | 716/8 |
| 5,537,568 A | 7/1996 | Yanai et al. | |
| 5,778,394 A | 7/1998 | Galtzur et al. | |
| 5,819,292 A | 10/1998 | Hitz et al. | |
| 5,845,147 A | 12/1998 | Vishlitzky et al. | |
| 5,857,208 A | 1/1999 | Ofek | |
| 5,915,264 A | 6/1999 | White et al. | |
| 6,076,148 A | 6/2000 | Kedem | |
| 6,408,369 B1 * | 6/2002 | Garrett et al. | 711/165 |
| 6,513,102 B1 * | 1/2003 | Garrett et al. | 711/165 |
| 6,772,302 B1 * | 8/2004 | Thompson | 711/162 |
| 6,898,685 B1 * | 5/2005 | Meiri et al. | 711/167 |
| 7,000,086 B1 * | 2/2006 | Meiri et al. | 711/167 |
| 7,054,883 B1 * | 5/2006 | Meiri et al. | 707/102 |

OTHER PUBLICATIONS

U.S. Appl. No. 09/850,551, filed May 7, 2001, by Josef Ezra.
U.S. Appl. No. 10/134,420, filed Apr. 29, 2002.

* cited by examiner

*Primary Examiner*—Greta Robinson
*Assistant Examiner*—Cheryl Lewis
(74) *Attorney, Agent, or Firm*—Muirhead and Saturnelli, LLC

(57) ABSTRACT

Accessing stored data includes providing a virtual storage area having a table of pointers that point to one of: a disk storage area and a volatile memory area, wherein the virtual storage area contains no sections of data, in response to a request for accessing data of the virtual storage area, determining whether a corresponding one of the pointers points to the disk storage area or points to the volatile storage area and accessing the data from the disk storage area or from the volatile storage area. Accessing stored data may also include associating a first one of the other storage areas with the virtual storage area, wherein the virtual storage area represents a copy of data of the disk storage area. Accessing stored data may also include causing all of the pointers of the table to initially point to sections of the disk storage area when the virtual storage area is initially associated with the disk storage area. Accessing stored data may also include, in response to a write to a first section on the disk storage area, copying data of the first section to a second section that is part of the volatile storage area and causing a corresponding one of the pointers of the table to point to the second section.

16 Claims, 26 Drawing Sheets

RESTORE TO NEW STD

RESTORE TO OLD STD DEV

STD AND VIR DEVICE

RESTORE TO MIRROR

RESTORE TO NEW VIR DEV

US 7,113,945 B1

VIRTUAL STORAGE DEVICE THAT USES VOLATILE MEMORY

CROSS REFERENCE TO RELATED APPLICATIONS

This application is a continuation-in-part of U.S. patent application Ser. No. 10/306,378 filed on Nov. 27, 2002 (pending), which is a continuation-in-part of U.S. patent application Ser. No. 10/120,016 filed on Apr. 10, 2002 (pending), both of which are incorporated by reference herein.

BACKGROUND OF THE INVENTION

1. Technical Field

This application relates to computer storage devices, and more particularly to the field of providing copies of portions of data stored on a computer storage device.

2. Description of Related Art

Host processor systems may store and retrieve data using a storage device containing a plurality of host interface units (host adapters), disk drives, and disk interface units (disk adapters). Such storage devices are provided, for example, by EMC Corporation of Hopkinton, Mass. and disclosed in U.S. Pat. No. 5,206,939 to Yanai et al., U.S. Pat. No. 5,778,394 to Galtzur et al., U.S. Pat. No. 5,845,147 to Vishlitzky et al., and U.S. Pat. No. 5,857,208 to Ofek. The host systems access the storage device through a plurality of channels provided therewith. Host systems provide data and access control information through the channels of the storage device and the storage device provides data to the host systems also through the channels. The host systems do not address the disk drives of the storage device directly, but rather, access what appears to the host systems as a plurality of logical volumes. The logical volumes may or may nor correspond to the actual disk drives.

In some instances, it may desirable to provide a copy of a logical volume where the copy is then accessed by other processes. For example, to test new software on actual stored data, a copy of a logical volume containing the data may be made and the copy, as opposed to the original data, may be used to test new software. Once the test is complete, the copy may be eliminated. Thus, the new software is tested on actual data without affecting the actual data. This reduces the likelihood that testing new software and/or functionality will corrupt actual data.

One difficulty with making such copies is that they require as much storage space as the logical volume from which the data is obtained since the copy process simply creates a new volume containing all the data of the original volume. In addition, in some instances, the differences between the original volume and the copy are minimal. Thus, the extra storage space required for such a copy of a logical volume is used somewhat inefficiently since it merely duplicates already-existing data. Accordingly, it would be desirable to provide a mechanism for copying data in a way that uses storage space efficiently.

SUMMARY OF THE INVENTION

According to the present invention, accessing stored data includes providing a virtual storage area having a table of pointers that point to one of: a disk storage area and a volatile memory area, wherein the virtual storage area contains no sections of data, in response to a request for accessing data of the virtual storage area, determining whether a corresponding one of the pointers points to the disk storage area or points to the volatile storage area and accessing the data from the disk storage area or from the volatile storage area. Accessing stored data may also include associating a first one of the other storage areas with the virtual storage area, wherein the virtual storage area represents a copy of data of the disk storage area. Accessing stored data may also include causing all of the pointers of the table to initially point to sections of the disk storage area when the virtual storage area is initially associated with the disk storage area. Accessing stored data may also include, in response to a write to a first section on the disk storage area, copying data of the first section to a second section that is part of the volatile storage area and causing a corresponding one of the pointers of the table to point to the second section. Accessing stored data may also include associating a data indicator with sections of the disk storage area, wherein the data indicator for a particular section indicates whether a write operation has been performed to the particular section after the disk storage area has been associated with the virtual storage area. Accessing stored data may also include, in response to a write to a first section on the disk storage area and the data indicator indicating that no write operation has been performed to the first section after the disk storage area has been associated with the virtual storage area, copying data of the first section to a second section that is part of the volatile memory and causing a corresponding one of the pointers of the table to point to the second section. Accessing stored data may also include, following copying the data from the first section to the second section, sending status information to a device that caused the write operation to be performed. Each of the sections of data may be a track of data. The disk storage areas may be a storage device. The volatile memory may be a cache, in which case accessing stored data may also include the disk storage area sharing use of the cache with the virtual storage area.

According further to the present invention, a computer program product includes executable code that provides a virtual storage area having a table of pointers that point to one of: a disk storage area and a volatile memory area, wherein the virtual storage area contains no sections of data, executable code that determines which particular one of the areas contain the data in response to a request for accessing data of the virtual storage area, and executable code that accesses the data on the particular one of the areas using the table of pointers. The computer program product may also include executable code that associates the disk storage area with the virtual storage area, wherein the virtual storage area represents a copy of data of the disk storage area. The computer program product may also include executable code that causes all of the pointers of the table to initially point to sections of the disk storage area when the virtual storage area is initially associated with the disk storage area. The computer program product may also include executable code that copies data of the first section to a second section of the volatile memory area and causes a corresponding one of the pointers of the table to point to the second section in response to a write to the first section. The computer program product may also include executable code that associates a data indicator with sections of the disk storage area, wherein the data indicator for a particular section indicates whether a write operation has been performed to the particular section after the disk storage area has been associated with the virtual storage area. The computer program product may also include executable code that copies data of the first section to a second section that is on the volatile memory area and causes a corresponding one of the pointers of the table to point to the second section in response to a write to a first section on the disk storage area and the data indicator indicating that no write operation has been performed to the first section after the disk storage area has been associated with the virtual storage area. The computer program product may also include executable code that sends status information to a device that caused the write operation to be performed following copying the data from the first section to the second section. Each of the sections of data may be a track of data. The disk storage area may be a storage device. The volatile memory storage area may be a cache, in which case the computer program product may also include executable code that causes the disk storage area to share the cache with the virtual storage area.

DETAILED DESCRIPTION OF VARIOUS EMBODIMENTS

Figure 1:
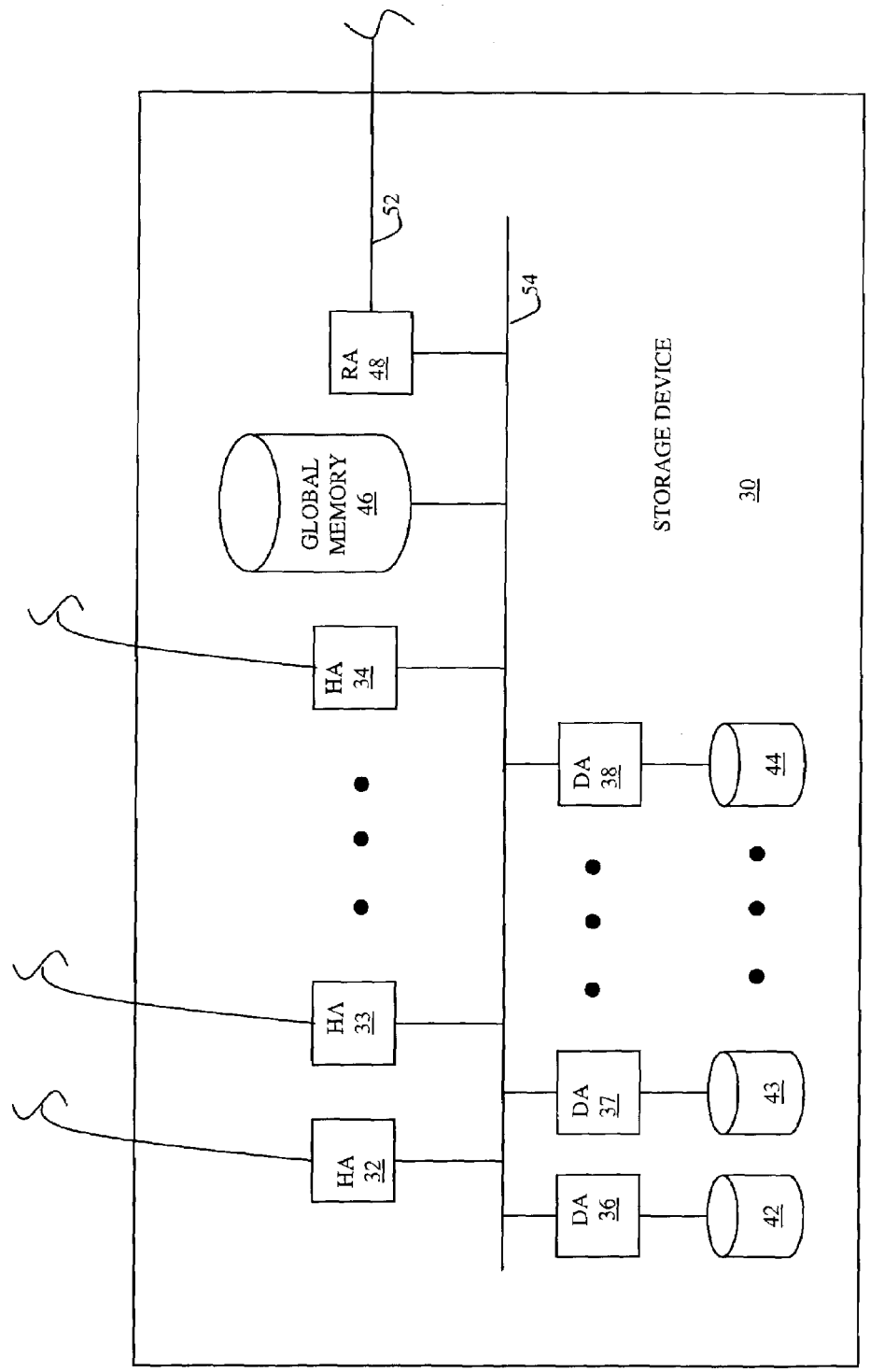
FIG. 1 is a diagram of a storage device used in connection with the system described herein.

Referring to FIG. 1, a storage device 30 includes a plurality of host adapters (HA) 32–34, a plurality of disk adapters (DA) 36–38 and a plurality of disk drives 42–44. Each of the disk drives 42–44 is coupled to a corresponding one of the DA's 36–38. The storage device 30 also includes a global memory 46 that may be accessed by the HA's 32–34 and the DA's 36–38. The storage device 30 also includes a RDF adapter (RA) 48 that may also access the global memory 46. The RA 48 may communicate with one or more additional remote storage devices (not shown) and/or one or more other remote devices (not shown) via a data link 52. The HA's 32–34, the DA's 36–38, the global memory 46 and the RA 48 are coupled to a bus 54 that is provided to facilitate communication therebetween.

Each of the HA's 32–34 may be coupled to one or more host computers (not shown) that access the storage device 30. The host computers (hosts) read data stored on the disk drives 42–44 and write data to the disk drives 42–44. The global memory 46 contains a cache memory that holds tracks of data from the disk drives 42–44 as well as storage for tables that may be accessed by the HA's 32–34, the DA's 36–38 and the RA 48. Note that, for the discussion herein, blocks of data are described as being a track or tracks of data. However, it will be appreciated by one of ordinary skill in the art, that the system described herein may work with any appropriate incremental amount, or section, of data, including possibly variable incremental amounts of data and/or fixed incremental amounts of data.

Figure 2:
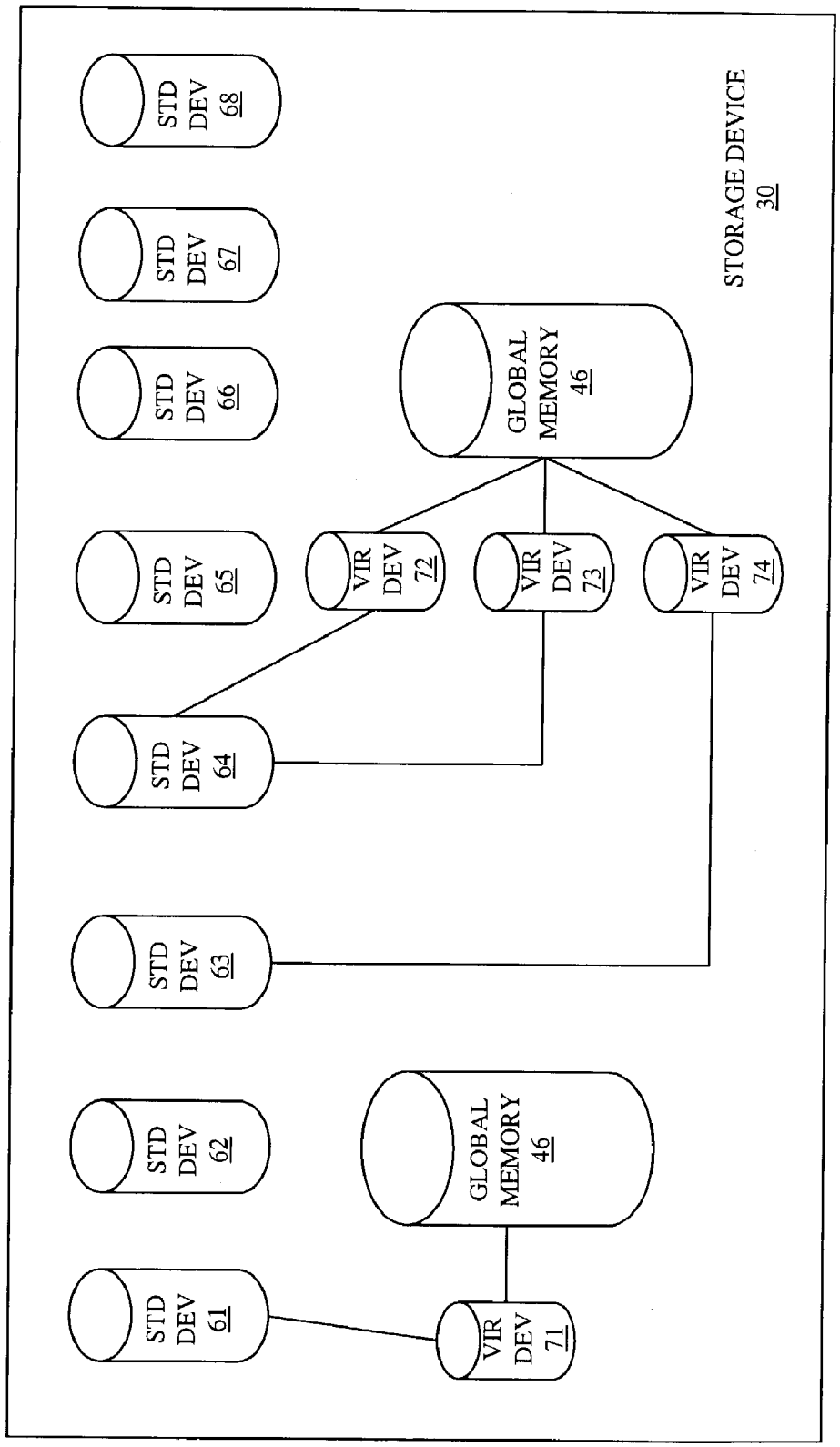
FIG. 2 is a diagram of a storage that shows various logical volumes that are used in connection with the system described herein.

Referring to FIG. 2, the storage device 30 is shown as including a plurality of standard logical devices 61–68. Each of the standard logical devices 61–68 may correspond to a volume that is accessible to one or more hosts coupled to the storage device 30. Each of the standard logical devices 61–68 may or may not correspond to one of the disk drives 42–44. Thus, for example, the standard logical device 61 may correspond to the disk drive 42, may correspond to a portion of the disk drive 42, or may correspond to a portion of the disk drive 42 and a portion of the disk drive 43. Each of the standard logical devices 61–68 appears to the host as a contiguous block of disk storage, even though each of the standard logical devices 61–68 may or may not correspond to actual contiguous physical storage of the disk drives 42–44.

The storage device 30 may also includes a plurality of virtual devices 71–74. The virtual devices 71–74 appear to a host coupled to the storage device 30 as volumes containing a contiguous block of data storage. Each of the virtual devices 71–74 may represent a point in time copy of an entire one of the standard logical devices 61–68, a portion of one of the standard logical devices 61–68, or a combination of portions or entire ones of the standard logical devices 61–68. However, as described in more detail elsewhere herein, the virtual devices 71–74 do not contain the track data from the standard logical devices 61–68. Instead, each of the virtual devices 71–74 is coupled to the global memory 46 that stores some or all the track data, as described in more detail elsewhere herein. The virtual devices 71–74 contain tables that point to either tracks of data on the standard logical devices 61–68 or appropriate portions of the global memory 46.

The virtual device 71 may represent a point in time copy of the standard logical device 61. As described in more detail elsewhere herein, the virtual device 71 is coupled to the global memory 46 that contains track data to facilitate the virtual device 71 appearing to a host to be a point in time copy of the standard logical device 61. It is possible for more than one virtual device to represent point in time copies of a single standard logical device. Thus, the virtual devices 72,73 are shown as being point in time copies of the standard logical device 64. The virtual devices 72,73 may represent the same point in time copy of the standard logical device 64 or, alternatively, may represent point in time copies of the standard logical device 64 taken at different times. Note that only some of the standard logical devices 61–68 are shown as being associated with a corresponding one of the virtual devices 71–74 while others of the standard logical devices 61–68 are not.

In some embodiments, it may be possible to implement the system described herein using storage areas, instead of storage devices. Thus, for example, the virtual devices 71–74 may be virtual storage areas and the standard logical devices 61–68 may be standard logical areas. In some instances, such an implementation may allow for hybrid logical/virtual devices where a single logical device has portions that behave as a standard logical device and/or portions that behave as a virtual device. Accordingly, it should be understood that, in appropriate instances, references to devices in the discussion herein may also apply to storage areas that may or may not correspond directly with a storage device.

Figure 3:
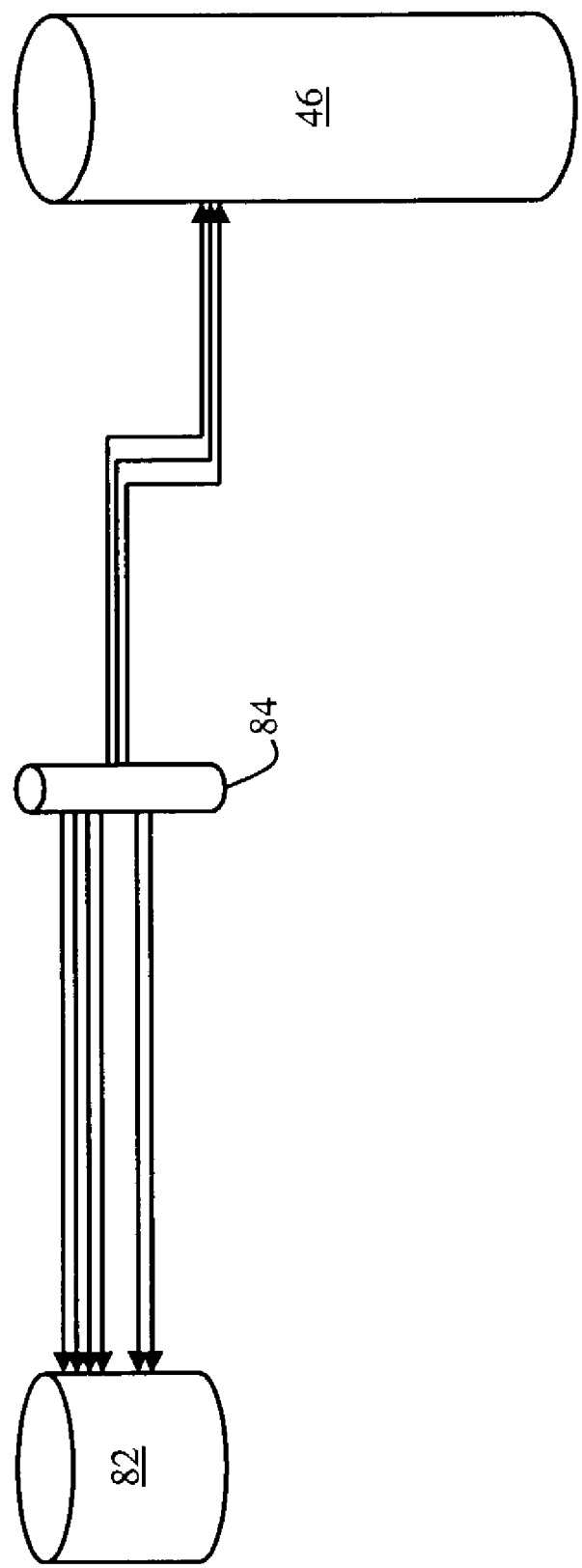
FIG. 3 is a diagram showing use of a virtual device according to the system described herein.

Referring to FIG. 3, a diagram shows a standard logical device 82, a virtual device 84, and the global memory 46. As discussed above, the virtual device 84 may represent a point in time copy of all or a portion of the standard logical device 82. A host coupled to a storage device that accesses the virtual device 84 may access the virtual device 84 in the same way that the host would access the standard logical device 82. However, the virtual device 84 does not contain any track data from the standard logical device 82. Instead, the virtual device 84 includes a plurality of table entries that point to tracks on either the standard logical device 82 or the global memory 46.

When the virtual device is established 84 (e.g., when a point in time copy is made of the standard logical device 82), the virtual device 84 is created and provided with appropriate table entries that, at the time of establishment, point to tracks of the standard logical device 82. A host accessing the virtual device 84 to read a track would read the appropriate track from the standard logical device 82 based on the table entry of the virtual device 84 pointing to the track of the standard logical device 82.

After the virtual device 84 has been established, it is possible for a host to write data to the standard logical device 82. In that case, the previous data that was stored on the standard logical device 82 is copied to the global memory 46 and the table entries of the virtual device 84 that previously pointed to tracks of the standard logical device 82 would be modified to point to the new tracks of the global memory 46 to which the data had been copied. In some embodiments, the tracks of data may be stored as cache slots of the global memory 46. Accordingly, a cache slot of the global memory 46 may be used as a conventional cache slot for the storage device 30, storage for the virtual device 84, or both (as explained elsewhere herein).

A host accessing the virtual device 84 would read either tracks from the standard logical device 82 that have not changed since the virtual device 84 was established or, alternatively, would read corresponding tracks from the global memory 46 that contain data copied from the standard logical device 82 after the virtual device 84 was established. Adjusting data and pointers in connection with reads and writes to and from the standard logical device 82 and virtual device 84 is discussed in more detail elsewhere herein.

In an embodiment described herein, hosts would not have direct access to the portion of the global memory 46 that contains data for the virtual device 84. In addition, for an embodiment described herein, the standard logical device 82, the virtual device 84, and the global memory 46 may be provided on the single storage device 30. However, it is possible to provide the different logical devices and/or the global memory on separate storage devices interconnected using, for example, the RDF protocol or other remote communication protocols. In addition, it may be possible to have portions of one or more of the standard logical device 82, the virtual device 84, and/or the global memory 46 provided on separate storage devices that are appropriately interconnected.

Figure 4:
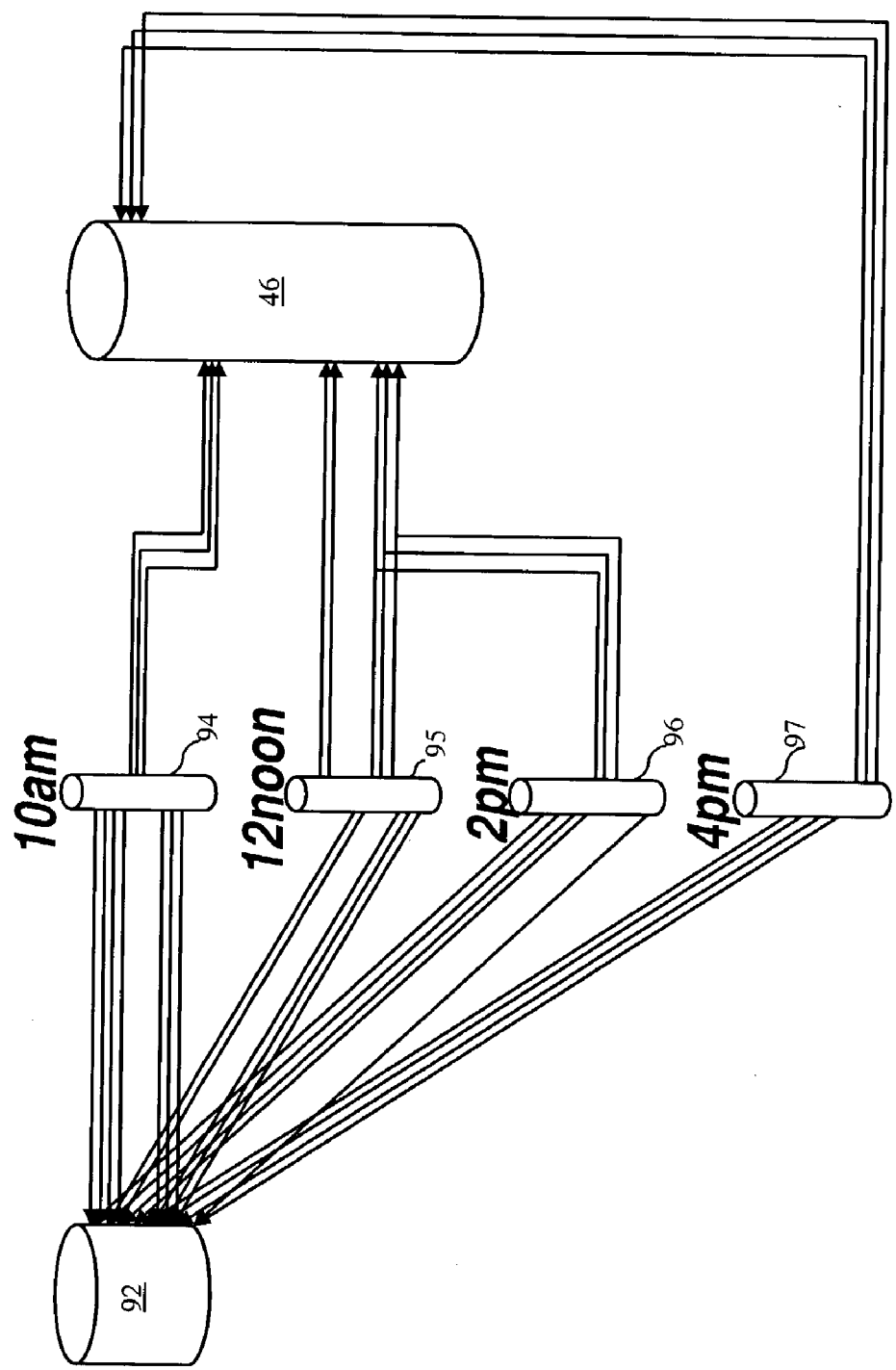
FIG. 4 is a diagram showing use of a plurality of virtual devices according to the system described herein.

Referring to FIG. 4, another example of the use of virtual devices shows a standard logical device 92, a plurality of virtual devices 94–97 and the global memory 46. In the example of FIG. 4, the virtual device 94 represents a point in time copy of the standard logical device 92 taken at ten a.m. Similarly, the virtual device 95 represents a copy of the standard logical device 92 taken at twelve noon, the virtual device 96 represents a copy of the standard logical device 92 taken at two p.m., and the virtual device 97 represents a copy of the standard logical device 92 taken at four p.m. Note that all of the virtual devices 94–97 may share the global memory 46. In addition, it is possible for table entries of more than one of the virtual devices 94–97, or, a subset of the table entries of the virtual devices 94–97, to point to the same tracks (cache slots) of the global memory 46. For example, the virtual device 95 and the virtual device 96 are shown as having table entries that point to the same tracks (slots) of the global memory 46.

Figure 5:
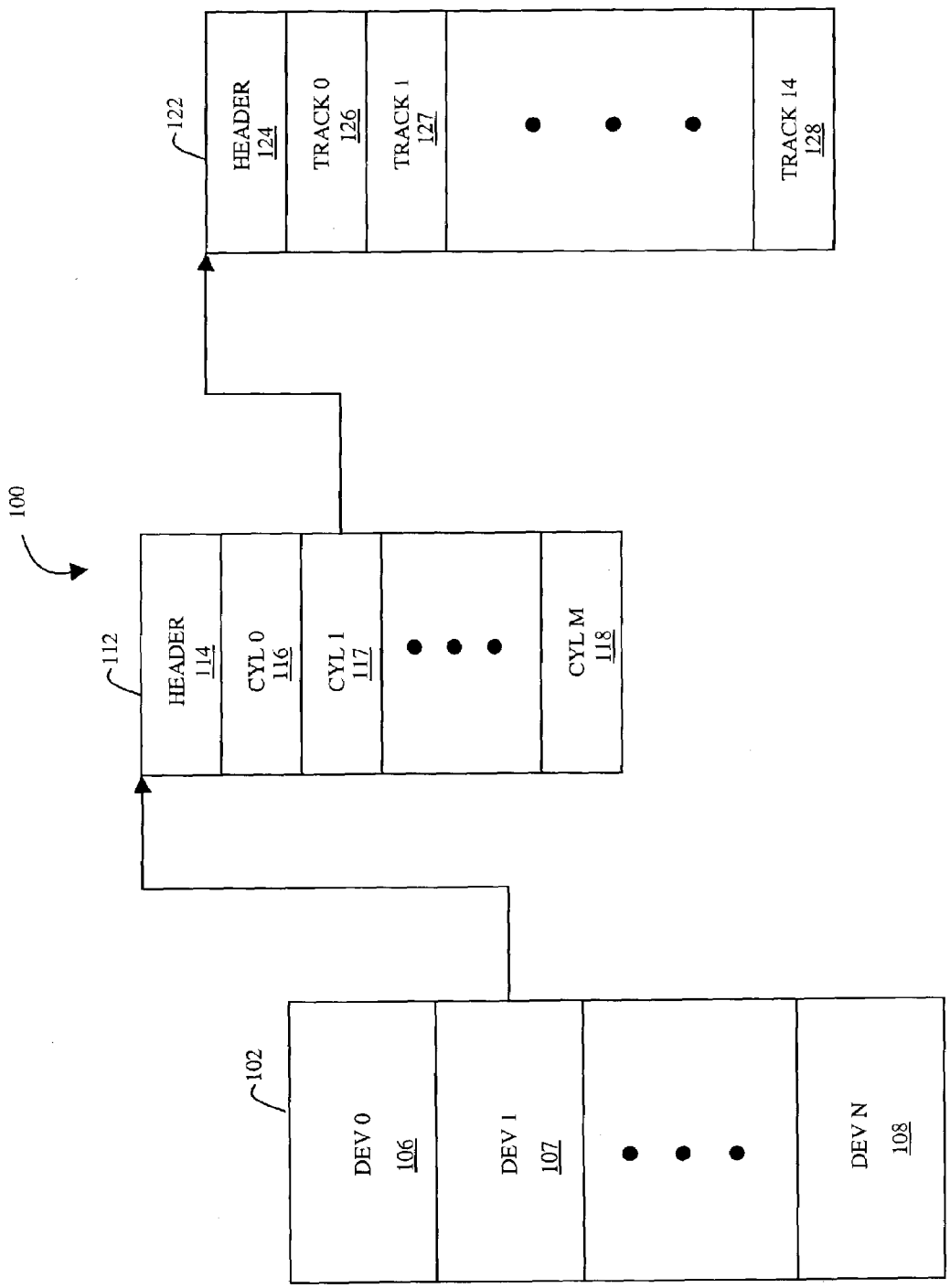
FIG. 5 is a diagram showing device tables used in connection with the system described herein.

Referring to FIG. 5, a diagram 100 illustrates tables that are used to keep track of device information. A first table 102 corresponds to all of the devices used by a storage device or by an element of a storage device, such as an HA and/or a DA. The table 102 includes a plurality of logical device entries 106–108 that correspond to all the logical devices used by the storage device (or portion of the storage device). The entries in the table 102 include descriptions for standard logical devices, virtual devices, and other types of logical devices.

Each of the entries 106–108 of the table 102 correspond to another table that contains information for each of the logical devices. For example, the entry 107 may correspond to a table 112. The table 112 includes a header that contains overhead information. The table 112 also includes entries 116–118 for each of the cylinders of the logical device. In an embodiment disclosed herein, a logical device may contain any number of cylinders depending upon how the logical device is initialized. However, in other embodiments, a logical device may contain a fixed number of cylinders.

Each of the cylinder entries 116–118 corresponds to a track table. For example, the entry 117 may correspond to a track table 122 that includes a header 124 having overhead information. The track table 122 also includes entries 126–128 for each of the tracks. In an embodiment disclosed herein, there are fifteen tracks for every cylinder. However, for other embodiments, it may be possible to have different numbers of tracks for each of the cylinders or even a variable number of tracks for each cylinder. For standard logical devices, the information in each of the entries 126–128 includes a pointer (either direct or indirect) to the physical address on one of the disk drives 42–44 of the storage device 30 (or a remote storage device if the system is so configured). Thus, the track table 122 may be used to map logical addresses of the logical device corresponding to the tables 102, 112, 122 to physical addresses on the disk drives 42–44 of the storage device 30. For virtual devices, each of the entries 126–128 of the table 122 points to a track of a corresponding standard logical device or to a corresponding track (cache slot) of the global memory 46. For other embodiments, however, it may be possible to use a different mechanism where the tables 102, 122, 122 are used only for standard logical devices that contain tracks of data while another type of table, such as a simple array of tracks, is used by virtual devices to map tracks of the virtual devices to tracks of corresponding standard logical devices or cache slots of the global memory 46.

The tables 102, 112, 122 of FIG. 5 may be stored in the global memory 46 of the storage device 30 (in a locaction different from the cache slots). In addition, the tables corresponding to devices accessed by a particular host may be stored in local memory of the corresponding one of the HA's 32–36. In addition, the RA 48 and/or the DA's 36–38 may also use and locally store portions of the tables 102, 112, 122.

In some embodiments, a virtual device table track entry is set to null to indicate that the relevant data is provided on a corresponding track of the standard logical device. Thus, each entry in the track table of a virtual device could be either null (indicating that the relevant data is provided on the standard logical device) or could be a pointer to a location in the global memory 46 (i.e., a cache slot). Accordingly, in some embodiments, a conventional track table with entries that point to a disk device may use sixteen bytes per table entry while a virtual device table according to the system described herein uses only eight bytes per entry since each entry of the table is either null or points to the global memory 46 (cache slot), and therefore never requires a sixteen byte pointer to a specific disk location.

Note that, in some instances, access to data may be controlled by a flag or lock that prohibits multiple processes having access to the data simultaneously. This is especially useful in instances where a device table is being read or modified. The system disclosed herein contemplates any one of a variety of mechanisms for controlling access to data by multiple processes, including conventional combinations of software and/or hardware locks, also known as "flags" or "semaphores". In some instances, a process accessing data may need to wait until another process releases the data. In one embodiment, a hardware lock controls access to a software lock (flag) so that a process first obtains control of the hardware lock, tests the software lock, and then, if the software lock is clear, the process sets the software lock and then releases the hardware lock. If the process gets the hardware lock and determines that the software lock is not clear, then the process releases the hardware lock so that another process that has set the software lock can clear the software lock at a later time. Further note that, in some instances, it is useful to first read a table entry corresponding to a particular track, read the track into a cache slot (if the track is not already in cache), lock the cache slot, and then reread the corresponding table entry.

Figure 6:
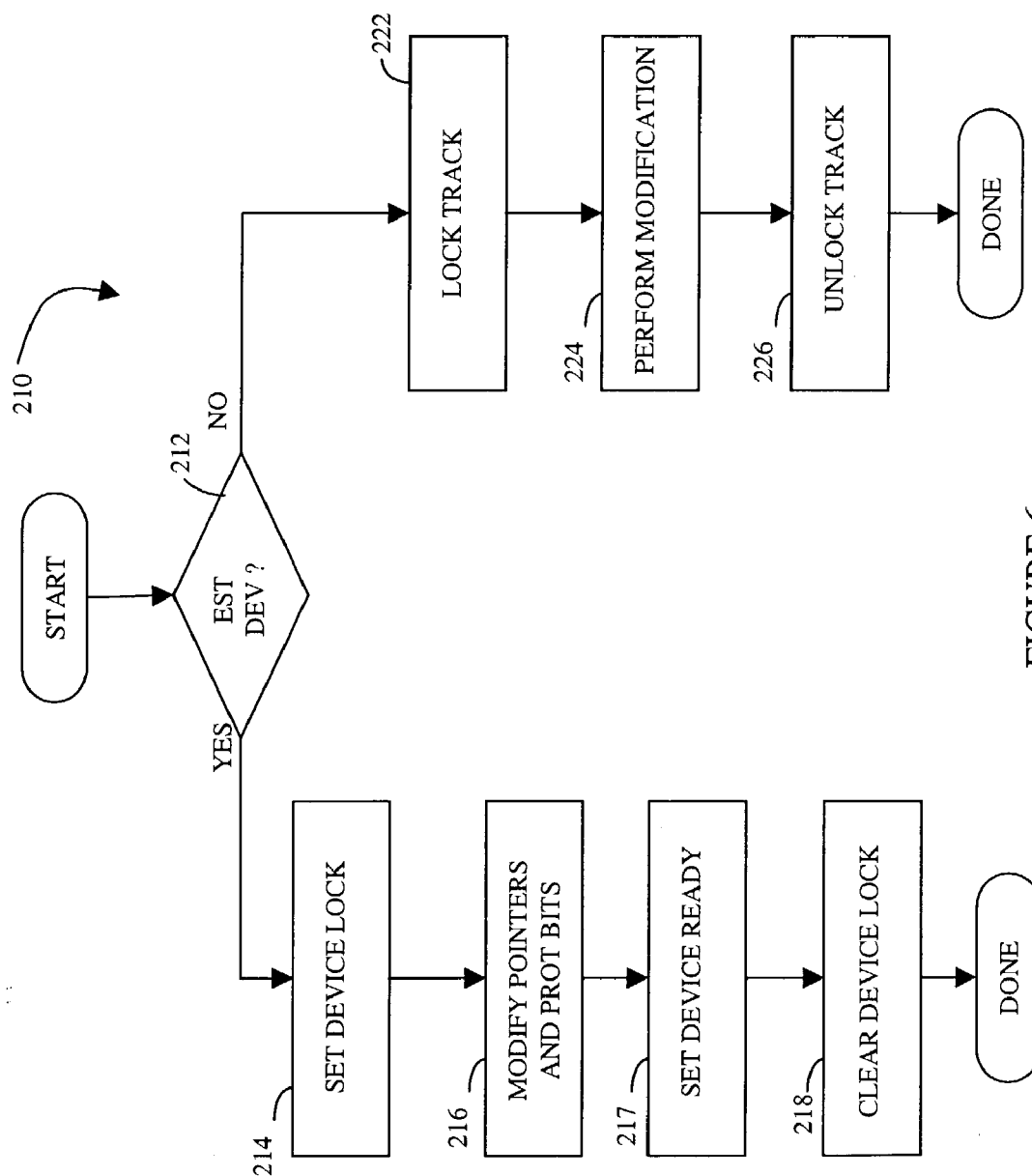
FIG. 6 is a flow chart illustrating modification of a virtual device table and establishing a virtual device according to the system described herein.

Referring to FIG. 6, a flow chart 210 illustrates steps performed in connection with modifying a device table corresponding to a virtual device. Processing begins at a first step 212 where it is determined if the modifications to the table relate to establishing the virtual device. As discussed elsewhere herein, establishing a virtual device includes making the virtual device available for access by a host after the virtual device is created. Establishing a virtual device causes the virtual device to be associated with a standard logical device (and thus, represent a point in time copy of the standard logical device at the time of establishment). Prior to being associated with a standard logical device, a virtual device is not established and is not accessible by a host. After being established, a virtual device is accessible by a host.

If it is determined at the step 212 that the modifications to the table relate to establishing the virtual device, then control passes from the step 212 to a step 214 where a device lock for the virtual device is set to prohibit access to the table by other processes. The device lock is comparable to the cache slot lock, discussed elsewhere herein.

Following the step 214 is a step 216 where the pointers of the virtual device table are made to point to tracks of the standard logical device and where a protection bit is set for each of the tracks of the standard logical device that corresponds to the virtual device being established. In an embodiment disclosed herein, each of the tracks of the standard logical device has sixteen bits which may be set as protection bits, one for each virtual device established to the standard logical device. In some embodiments, the protection bits may have uses that are unrelated to virtual devices. A new virtual device being established may be assigned a new bit position in the sixteen bit field while the bit for each track of the standard logical device may be set. As discussed in more detail elsewhere herein, the protection bit being set followed by a subsequent write to the standard logical device indicates that special processing needs to take place to accommodate the virtual device established to the standard logical device. The special processing is described in more detail elsewhere herein. Also at the step 216, the track entries for the device table for the virtual device are all modified to point to the corresponding tracks of the standard logical device. Thus, when the virtual device is first established, all of the pointers of the device table of the virtual device point to the tracks of the standard logical device. As discussed above, in some embodiments, a virtual device table track entry is set to null to indicate that the relevant data is provided on a corresponding track of the standard logical device.

Following the step 216 is a step 217 the virtual device is set to the ready state, thus making the virtual device accessible to hosts. Following the step 217 is a step 218 where the virtual device is unlocked, thus allowing access by other processes. Following the step 218, processing is complete.

If it is determined that the test step 212 that the virtual device is not being established (i.e., some other operation is being performed), then control passes from the test step 212 to a step 222 to lock a track corresponding to the entry of the device table for the virtual device that is being modified. Note that the track that is locked at the step 222 may either be a track on the standard logical device (if the entry of interest in the device table of the virtual device points to the standard logical device) or a track (cache slot) of the global memory 46 (if the entry of interest points to the global memory 46). Following the step 222 is a step 224 where the modification to the device table for the virtual device is performed. Following the step 224 is a step 226 where the track is unlocked. Following the step 226, processing is complete.

Figure 7:
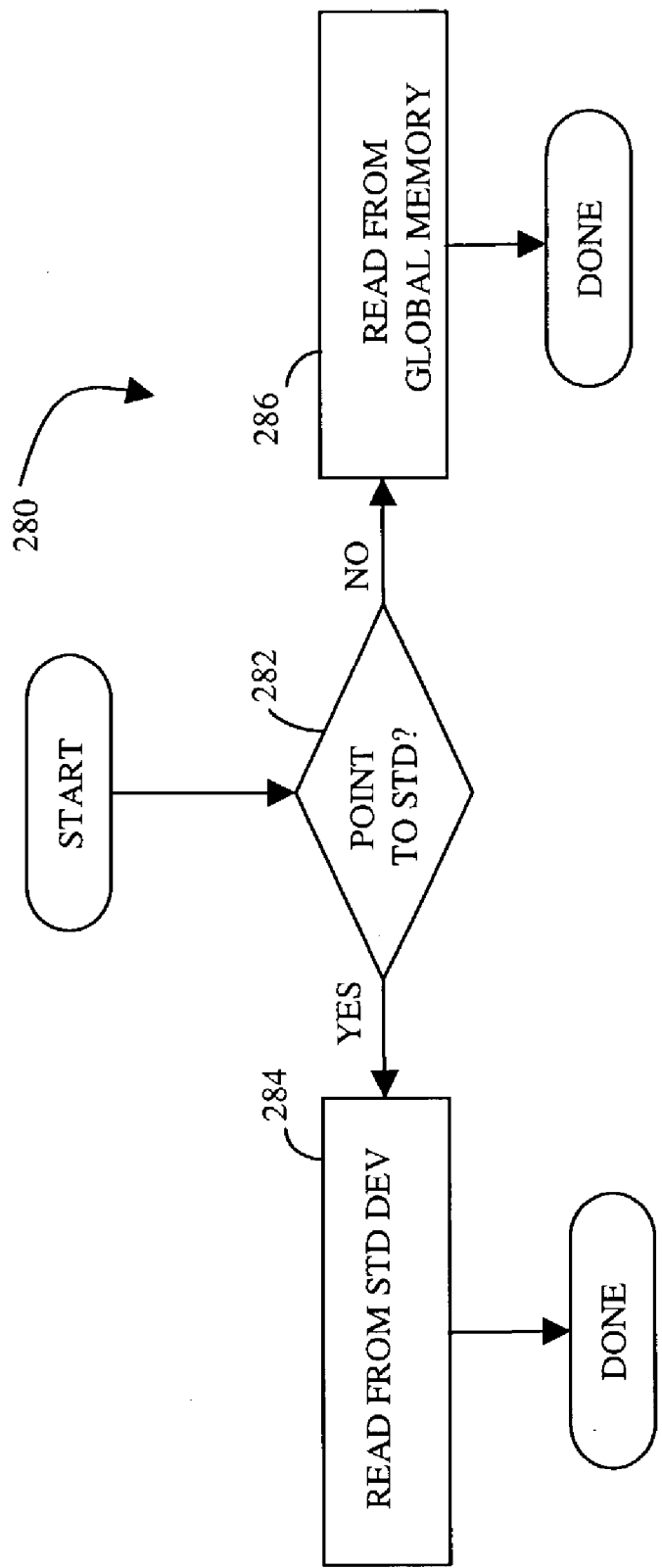
FIG. 7 is a flow chart illustrating steps performed in connection with reading a virtual device according to the system described herein.

Referring to FIG. 7, a flow chart 280 illustrates steps performed in connection with reading data from a virtual device. Processing begins at a test step 282, where it is determined if the device table entry for the track of interest of the virtual device points to the standard logical device or points to the global memory. If it is determined at the test step 282 that the table points to the standard logical device, then control passes from the step 282 to a step 284, where the track is read from the standard logical device. Following the step 284, processing is complete. Alternatively, if it determined at the test step 282 that the device table of the virtual device points to the global memory, then control passes from the step 282 to a step 286, where the track of interest is read from the global memory. Following the step 286, processing is complete.

Note that in some instances, it may be possible that prior to the test step 282, it is determined that the track of interest being read is already in the cache memory (global memory). In that case, the track may be obtained from the cache memory without executing any of the steps 282, 284, 286.

Figure 8:
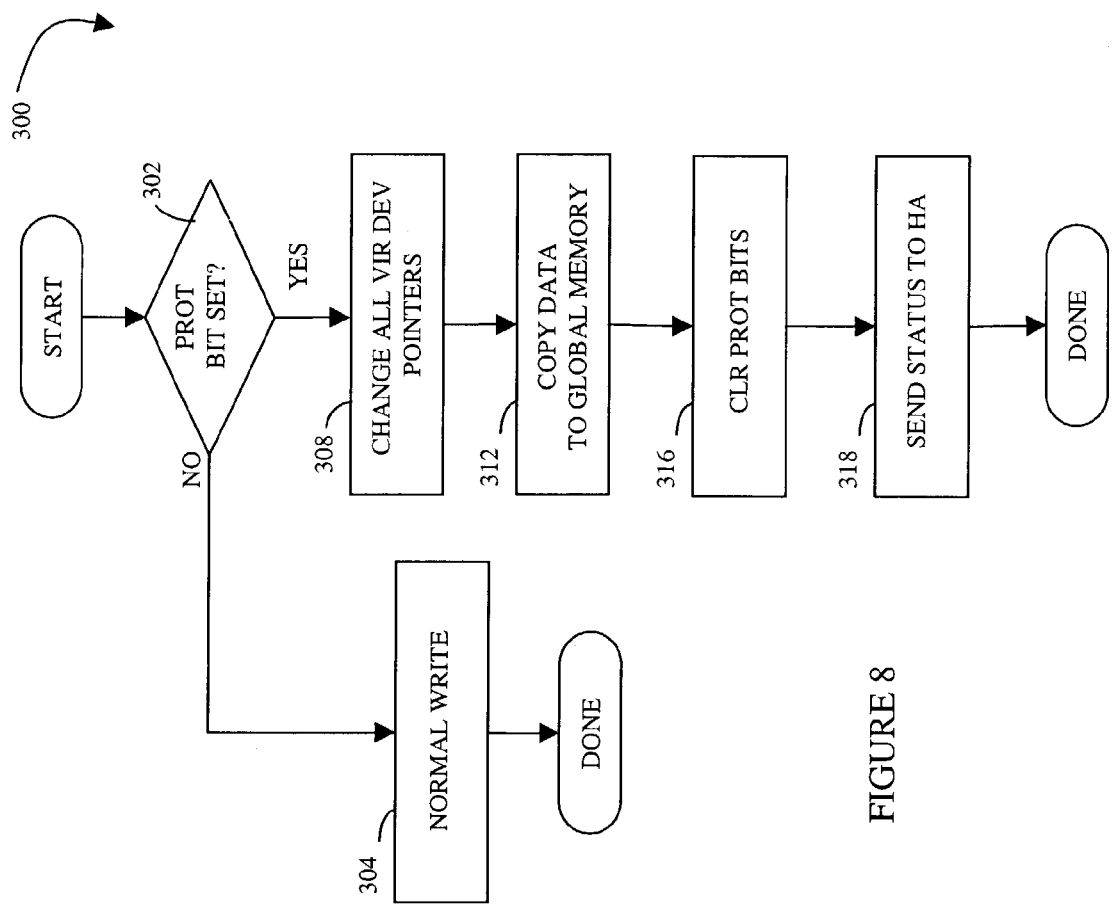
FIG. 8 is a flow chart illustrating steps performed by a disk adapter in connection with writing to a standard logical device to which a virtual device has been established according to the system described herein.

Referring to FIG. 8, a flow chart 300 illustrates steps performed by a DA in connection with writing to a track of a standard logical device to which a virtual device has been previously established. Processing begins at a first step 302 where it is determined if any protection bits for the track being written on the standard logical device have been set. If it determined at the test step 302 that the protection bits are not set, then control transfers from the step 302 to a step 304, where a normal write operation is performed. That is, at the step 304, data is written to the standard logical device in a conventional fashion without regard to the existence of a virtual device that had been previously established to the standard logical device. Following the step 304, processing is complete.

If it is determined at the test step 302 that one or more protection bits have been set on the track of the standard logical device that is being written, control passes from the step 302 to a step 308, where, for each virtual device that corresponds to a protection bit that was determined to be set at the test step 302, the pointers of the virtual devices, which initially pointed to the track being written on the standard logical device, are modified at the step 308 to point to a track (cache slot) in global memory. As discussed above, it is possible to have more than one virtual device established to a standard logical device. For each virtual device that has been established to a particular standard logical device, a specific protection bit will be set for each of the tracks of the standard logical device. Thus, at the step 308, the track pointers are changed for all the virtual devices corresponding to a set protection bit detected at the step 302. The track pointers in the device tables of virtual devices are modified to point to the new track provided in the global memory.

Following the step 308 is a step 312, where the data is caused to be copied from the standard logical device to the new track (cache slot) in the global memory. In an embodiment disclosed herein, the data may be copied by moving the data from disk storage to the global memory of the storage device (e.g., into a cache slot). Since all the pointers are modified at the step 308, any virtual device that has been established to the standard logical device prior to the track being written now points to the old data (i.e., the data as it existed on the track of the standard logical device when the virtual devices were established). Note also that, in connection with copying the track, the protection bits of the standard logical device track are copied to virtual device map bits for the track (cache slot) provided in global memory, which is explained in more detail elsewhere herein.

Following the step 312 is a step 316, where the protection bits of the tracks of the standard logical device being written are cleared. Following the step 316 is a step 318, where status is sent to the HA. Following the step 318, processing is complete.

Note that once the HA receives status, the HA may perform a normal write operation and, in that case, at the test step 302, the protection bits will not be set, since the bits are cleared at the step 316. The HA that is performing the write operation sees the protection bits that are set at the step 302 and sends a protection request to the appropriate DA. The HA then may disconnect from the DA and wait for status to arrive from the DA indicating that a normal write may be performed. While the HA is disconnected and waiting for status from the DA, the DA may perform the steps disclosed in the flow chart 300. This is described in more detail below.

Figure 9:
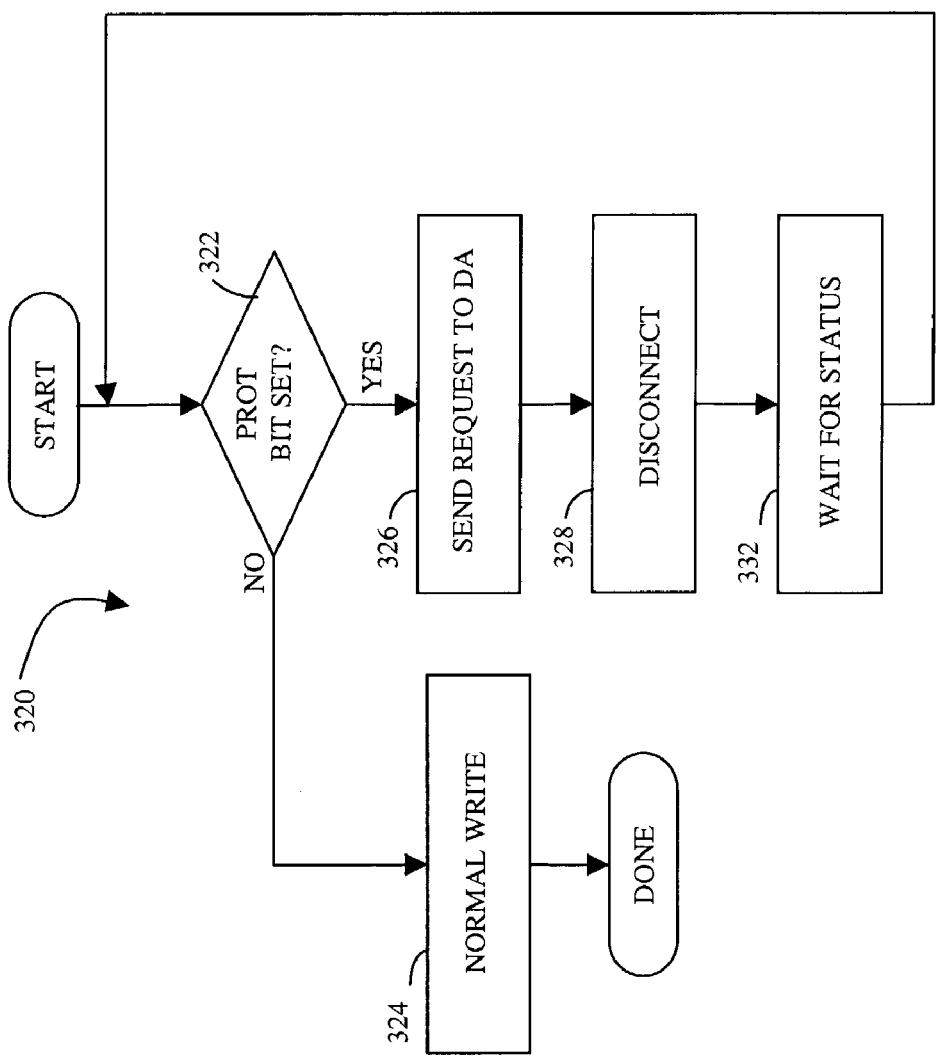
FIG. 9 is a flow chart illustrating steps performed by a host adapter in connection with writing to a standard logical device to which a virtual device has been established according to the system described herein.
Figure 10:
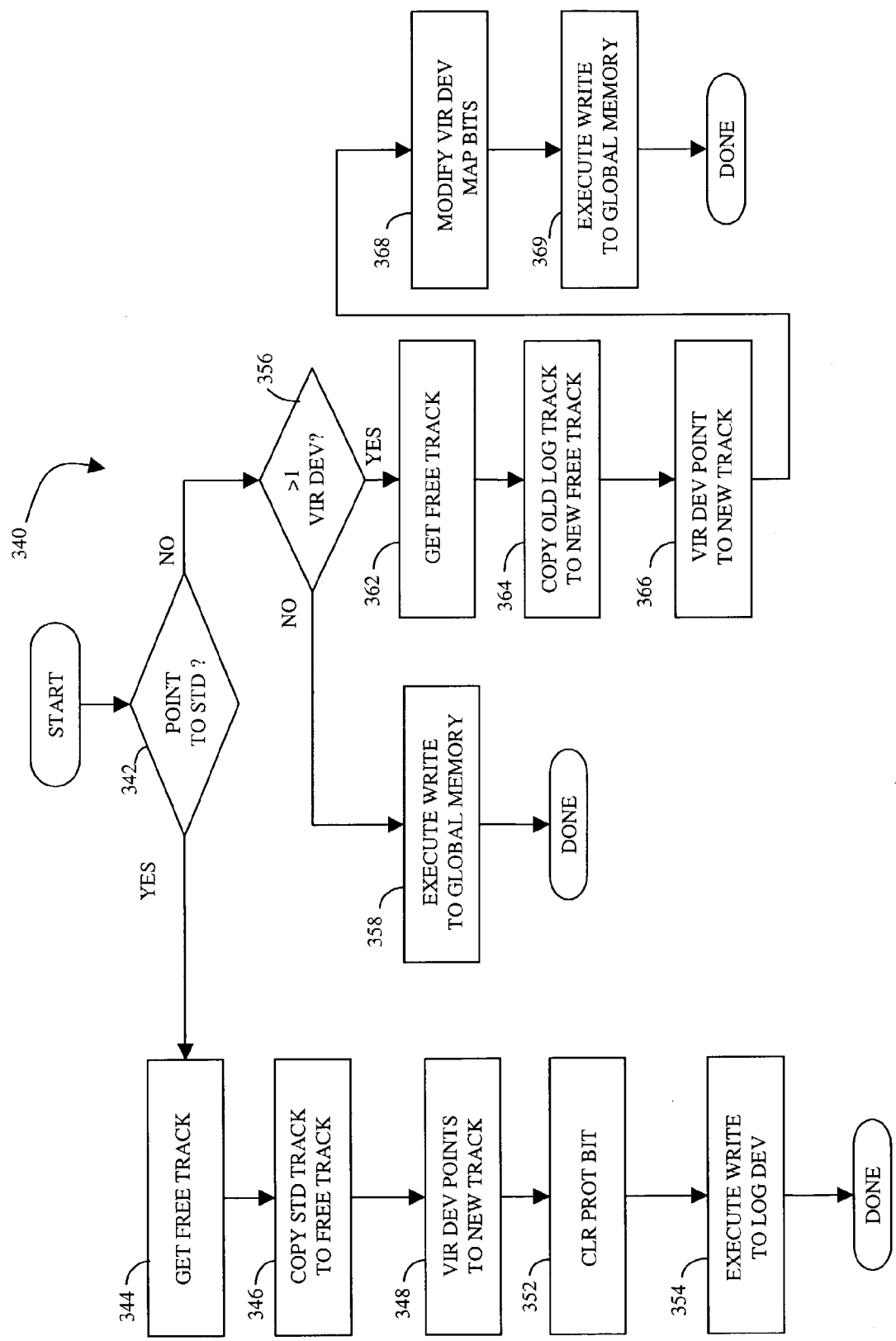
FIG. 10 is a flow chart illustrating steps performed in connection with writing to a virtual device according to the system described herein.

Referring to FIG. 9, a flow chart 320 illustrates steps performed by an HA in connection with a write to a standard logical device to which one or more virtual devices have been established. Processing begins at a first test step 322, where it is determined if any protection bits are set for the tracks of the standard logical device that are being written. If it is determined at the test step 322 that no protection bits are set, then control passes from the step 322 to a step 324, where a normal write is performed. Following the step 324, processing is complete.

If it is determined at the test step 322 that one or more protection bits are set for the tracks of the standard logical device that are being written, control passes from the step 322 to a step 326, where the HA sends a request to the DA indicating that protection bits are set for the tracks. When the DA receives the request that is sent at the step 326, the DA performs the operations set forth in the flow chart 300 of FIG. 8, discussed above. Following the step 326 is a step 328, where the HA disconnects from the DA in order to allow (possibly unrelated) operations to be performed with the DA by other processes and/or other HA's.

Following the step 328 is a step 332, where the HA waits for the DA to perform the operations set forth in the flow chart 300 of FIG. 8 and to send status to the HA indicating that the appropriate steps have been performed to handle the set protection bits. Following the step 332, processing transfers back to the step 322, where the protection bits for the track of the standard logical device are again tested. Note that on a second iteration, it is expected that the protection bits of the track of the standard logical device that are being written would be clear at the step 322, since the DA would have cleared the protection bits in connection with performing the steps of the flow chart 300. Of course, it is always possible that a new virtual device will be established to the standard logical device in between the DA clearing the protection bits and the step 322 being executed again. However, it is usually expected that the second iteration of the step 322 for a particular track of the standard logical device will determine that all the protection bits are clear, and control will transfer from the step 322 to the step 324 to perform a normal write.

Referring to FIG. 13, a flow chart 340 illustrates steps performed in connection with writing to a virtual device. The flow chart 340 represents steps performed by both the HA and the DA and thus could have been provided as two flow charts, similar to the flow chart 300 of FIG. 11 and the flow chart 320 of FIG. 12. However, it will be understood by those of ordinary skill in the art that the flow chart 340 may represent a division of steps similar to those set forth in the flow charts 300, 320 and described in the corresponding portions of the text of the specification.

Processing begins at a first step 342, where it is determined if the virtual device points to the standard logical device. If so, then control transfers from the test step 342 to a step 344, where a free track (cache slot) from the global memory is obtained. Following the step 344 is a step 346, where data from the standard logical device corresponding to the track being written is caused to be copied from the standard logical device to the track of the global memory obtained at the step 344. Following the step 346 is a step 348, where the virtual device pointer for the track is adjusted to point to the track obtained at the step 344. Following the step 348 is a step 352, where a protection bit corresponding to the virtual device is cleared in the track data of the standard logical device, thus indicating that no special processing on behalf of the virtual device is required when writing to the track of the standard logical device. Following the step 352 is a step 354, where the write is executed. At the step 354, the data to be written may be a track or a portion of a track that is written to the track obtained at the step 344. Following the step 354, processing is complete. If the data corresponds to an entire track, then it may be possible to eliminate the step 346, which copies data from the track of the standard logical device to the new track (cache slot) of the global memory, since writing an entire track's worth of data at the step 354 would overwrite all of the data copied at the step 346.

If it is determined at the test step 342 that the pointer for the track of the virtual devices being written does not point to the standard logical device, then control transfers from the step 342 to a test step 356, where it is determined if more than one virtual devices have been established to the standard logical device. If not, then control transfers from the step 356 to a step 358, where a normal write operation to the track (cache slot) of the global memory is performed. If it is determined at the test step 356 that there is more than one virtual device established to the standard logical device, then control transfers from the step 356 to a step 362, where a new track (cache slot) from the global memory is obtained.

Following the step 362 is a step 364, where the data of the track corresponding to the virtual device being written is copied to the track obtained at the step 362. Following the step 364 is a step 366, where the virtual device pointers are adjusted to point to the new track. In one embodiment, the pointer for the virtual device that is being written is made to point to the new track. Alternatively, it is possible to not change the pointer for the virtual device that is being written and, instead, adjust all the pointers for all of the other virtual devices that point to the track at the step 366.

Following the step 366 is a step 368 where the virtual device map bits for the tracks of the global memory are modified. For the global memory tracks, the virtual device map bits may be used to indicate which virtual devices point to each track, where, in one embodiment, there are sixteen virtual device map bits and each bit corresponds to a particular virtual device. Thus, the test at the step 356 may examine the virtual device map bits for the track.

Following the step 368 is a step 369, where the write is executed. Note that whether the write is executed to the track obtained at the step 362 or to the track that is initially pointed to by the virtual device being written depends upon how the pointers are adjusted at the step 366. In all cases, however, data is written to the track pointed to by the virtual device to which the data is being written. Following the step 369, processing is complete.

Figure 11:
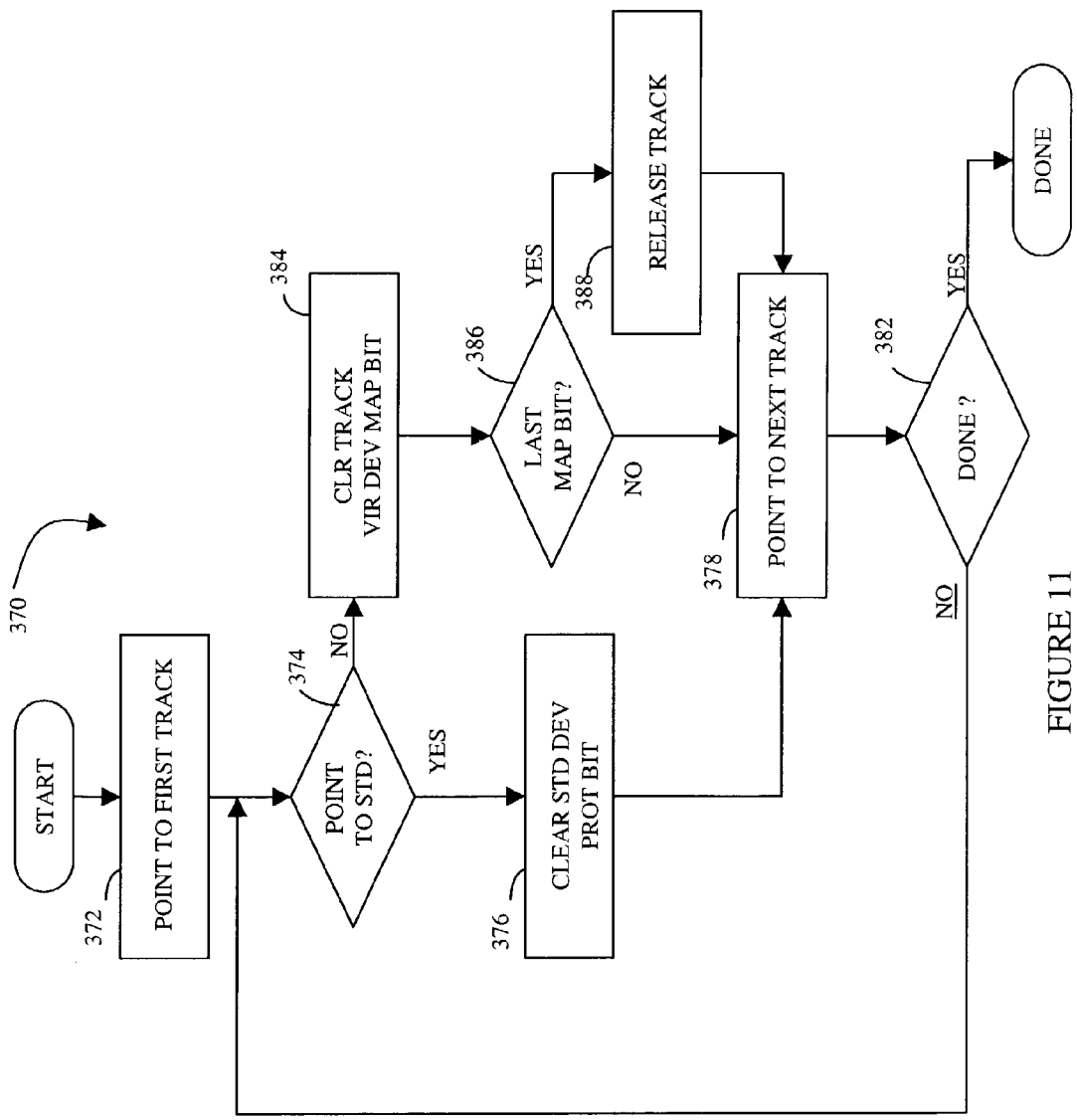
FIG. 11 is a flow chart illustrating steps performed in connection with removing a virtual device.

Referring to FIG. 11, a flow chart 370 illustrates steps performed in connection with removing (i.e., eliminating) a virtual device. Once a virtual device has been established and used for its intended purpose, it may be desirable to remove the virtual device. Processing begins at a first step 372, where a pointer is set to point to the first track of the virtual device. The virtual device is removed by examining each track corresponding to the virtual device.

Following the step 372 is a step 374, where it is determined if the track of the virtual device that is being examined points to the standard logical device. If so, then control transfers from the step 374 to a step 376 to clear the protection bit on the track of the standard logical device corresponding to the virtual device being removed. Following the step 376 is a step 378, where a pointer points to the next track of the virtual device in order to continue processing by examining the next track. Following the step 378 is a step 382, where it is determined if processing complete (i.e., all the tracks of the virtual device have been processed). If not, then control transfers from the step 382 back to the test step 374, discussed above.

If it is determined at the test step 374 that the track of the virtual device being examined does not point to the standard logical device, then control transfers from the step 374 to a step 384, where a virtual device map bit on the track (cache slot) of the global memory that corresponds to the virtual device being removed is cleared. Each track (cache slot) of the global memory may have a set of virtual device map bits indicating which virtual devices use the track. Thus, at the step 384, the virtual device map bit corresponding to the virtual device being removed is cleared.

Following the step 384 is a test step 386, where it is determined if the bit that was cleared at the step 384 was the last virtual device map bit that was set for the track. In other words, the test step 386 determines if there are other virtual devices that are using the track. If it is determined at the test step 386 that the last virtual device map bit was cleared at the step 384 (and thus, no other virtual devices use the track), then control transfers from the step 386 to a step 388, where the track is released.

Operations performed at the step 388 depend upon the track and the global memory. For example, if the track is a cache slot in global memory, then releasing the track at the step 388 may include making the cache slot available for use by other processes. Not that a resource, such as a cache slot, may be used by other processes, such as processes that use the cache slot for conventional caching. In that case, the test step 386 may include testing to see if any other process (in addition to any other virtual device mechanism) is using the cache slot before deciding to release the cache slot at the step 386.

One mechanism for determining when and if a cache slot should be released includes providing, for each record of data, a bit map for mirror devices that could use the record. Since a virtual device may be a mirror device, there will be a bit to set for the record indicating that it is being used by a virtual device. Other devices that may use the record include one or more standard logical devices that have modified the record while the record is in a cache slot. In any event, the record may not be removed from the global memory unless and until the bit map used for this purpose indicates that no devices need the data. Thus, for example, even though the virtual device being deactivated may clear a bit in connection with the step 384, the track may not be released at the step 388 because it is determined at the step 386 that other devices, such as a standard logical device or another virtual device, are still using the data. Such a mechanism for testing and releasing cache slots is disclosed, for example, in U.S. Pat. No. 5,537,568 issued on Jul. 16, 1996 and in U.S. patent application Ser. No. 09/850,551 filed on Jul. 7, 2001, both of which are incorporated by reference herein.

Following the step 388, or following the step 386 in some cases, is the step 378, discussed above, where the next track of the virtual device is pointed to for subsequent examination. Once all of the tracks corresponding to the virtual device have been processed, the tables and other data structures associated with the virtual device may also be removed although, in some embodiments, the tables and other data structures from the virtual device may be maintained, so long as the virtual device is not made available for use by hosts after the virtual device is deestablished.

In some embodiments, the virtual device may be made not ready to hosts prior to performing the steps illustrated by the flow chart 370. Alternatively, it may be possible to perform the steps illustrated by the flow chart 370 while the virtual device is ready to hosts and to simply issue an error message to any host that attempts to access the virtual device while the steps of the flow chart 370 are being performed and/or to any host attempting to access a track of the virtual device that has already been released.

Any one of a variety of techniques may be used for setting the protection bits on the tracks of the standard logical device at the step 216 of FIG. 6. For example, the protection bits for the tracks of the standard logical device may be set by locking the entire standard logical device (thus prohibiting any other access to the standard logical device) while all of the protection bits are being set. However, locking the entire standard logical device while all of the protection bits are being set may be unacceptable in certain instances. Accordingly, other techniques, described below, are available to set the protection bits in a way that does not necessarily cause the standard logical device to be inaccessible for as long as it takes to set all of the protection bits for all of the tracks.

Figure 12C:
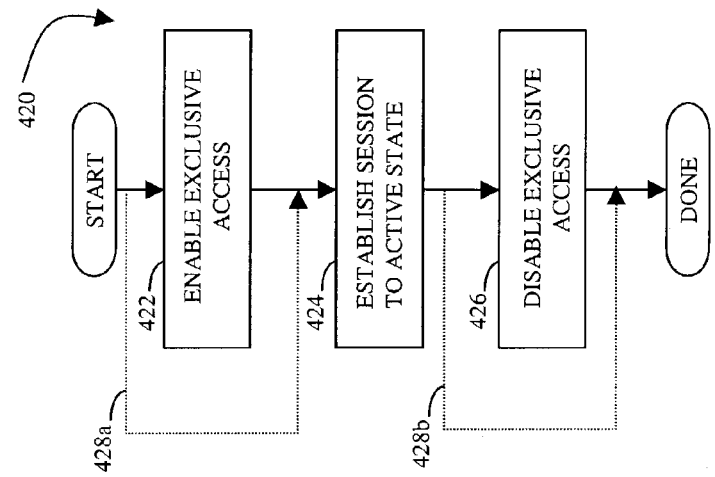
FIGS. 12A, 12B, and 12C are flow charts illustrating modifying protection bits of tracks of a storage device according to an embodiment of the system described herein.
Figure 12B:
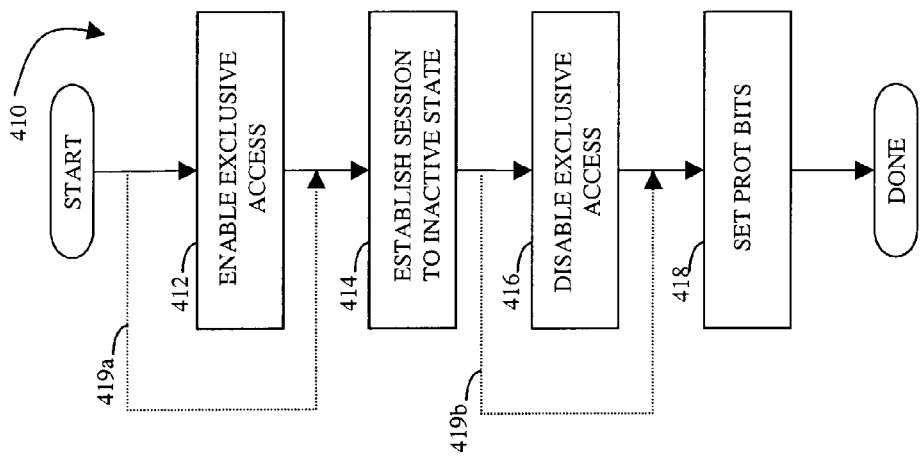
Figure 12A:
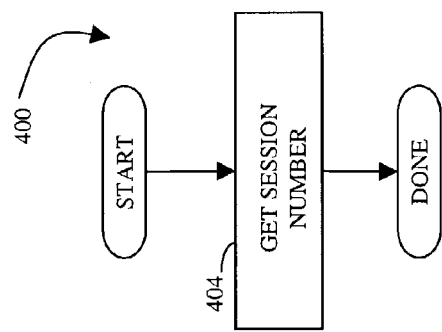

Referring to FIGS. 12A, 12B, and 12C, flow charts 400, 410, 420 illustrates steps performed in connection with a technique for setting protection bits of a standard logical device. The flow charts 400, 410, 420 are shown separately to illustrate that different parts of the process may be performed separately.

In the first flow chart 400 of FIG. 12A, processing begins at a first step 404, where a session number is obtained to reserve a particular session. In some embodiments, reserving a session number may be referred to as "attaching a session". In an embodiment disclosed herein, each particular session number corresponds to a particular bit position of a protection bit mask (i.e., corresponds to a particular protection bit). Following the step 404, processing is complete. In some embodiments where multiple processes may attempt to obtain a session number simultaneously, it may be necessary to provide additional functionality so that no two processes obtain the same session number. This functionality may be provided, for example, by locking the session resources (using software locks, hardware locks, or both) prior to obtaining the session number and then unlocking after obtaining the session number. Of course, other techniques exist and may be used to provide that the step 404 returns a unique session number to any process that requests a session number, even if multiple processes are requesting a session number at the same time.

Referring to FIG. 12B, the flow chart 410 illustrates steps for establishing a session to an inactive state and setting the protection bits. Processing begins at a first step 412, where the calling process is provided with exclusive access to the standard logical device (or at least to the portions the standard logical device relating to the operations that follow). In some instances, it is useful to provide a calling process with exclusive access to the resources being manipulated because simultaneous (or near simultaneous) accesses by multiple processes could cause improper operation. Thus, at the step 412 and in other instances throughout this application, exclusive access is given to a calling process. In addition, the mechanism for providing exclusive access could include any one of a variety of techniques, such as hardware locks, software locks (e.g., of system level data), time slicing, etc. Of course, in embodiments where there can only be one possible calling process (e.g., a non-multitasking system), it may not be necessary to perform any processing like that illustrated in the step 412 to enable exclusive access to a calling process.

Following the step 412 is a step 414 where the session (reserved previously at the step 404, discussed above) is established to an inactive state. In an embodiment herein, establishing the session to an inactive state involves moving a first value to a location in the header of the device table for the standard logical device. As discussed above, FIG. 5 shows the header field 114 in the device table 112. The header field 114 can contain various data locations, each of which corresponds to one of the protection bits (i.e., where each bit position corresponds to a particular session number). A value placed at each of the locations indicates the operation to be performed when a write occurs to a track having the corresponding one of the protection bits set. For example, there may be sixteen byte-length data locations in the header field 114, where each data location corresponds to one of sixteen possible protection bits (e.g., byte zero corresponds to protection bit zero, byte one corresponds to protection bit one, etc.). At the step 414, a first value is provided to one of the locations of the header field 114 to set the corresponding session to an inactive state.

Setting the session to an inactive state at the step 414 causes no operations to be performed when the corresponding protection bit is set. Thus, when a write occurs to a track where the protection bit is set, the code that handles management of protection bits will fetch the corresponding data from the device header, which in this case will indicate that the corresponding session is in an inactive state. In response to this, the code that handles management of protection bits will leave the protection bit set and will perform no other operations. The utility of this is discussed elsewhere herein.

Following the step 414 is a step 416 where the exclusive access provided at the step 412 is disabled. Disabling exclusive access at the step 416 allows multiple processes simultaneous access to the resources to which exclusive access was provided at the step 412. In some embodiments, disabling exclusive access at the step 416 simply undoes whatever was done at the step 412 (e.g., unlocking locked resources).

Following the step 416 is a step 418 where the corresponding protection bit is set for each of the tracks corresponding to the location of the header field 114 for the session number that was obtained at the step 404. Note that access by multiple process is provided to the standard logical device while the step 418 is performed. However, since the corresponding session is inactive, then any writes to tracks having a bit set at the step 418 that occur while the step 418 is being performed will result in no operations being performed and the protection bit remaining set. Following step 418, processing is complete. Note that the step 418 of setting the protection bits may be performed any time after the session is made inactive (and before the session is made active, discussed below). Thus, the step 418 does not necessarily need to immediately follow the steps performed to make the session inactive.

In some embodiments, it may not be necessary to enable/disable exclusive access to the resources of the standard logical device. For example, if establishing the session to an inactive state at the step 414 may be performed in a single unitary step (e.g., one uninterruptible write operation), it may not be necessary to execute the steps 412, 416. This is illustrated by alternative paths 419a, 419b shown in the flow chart 410.

Referring to FIG. 12C, the flow chart 420 illustrates steps performed to activate a session. Processing begins at a first step 422 where exclusive access to the standard logical device is enabled (like in the step 412, discussed above), thus preventing access thereto by another process. Following the step 422 is a step 424 where the session is made active by, for example, writing a second value to the header field 114 of the table for the standard logical device. The second value is provided in the same location as the first value and overwrites the first value. The second value indicates the special processing that is to be performed in connection with the corresponding protection bit being set. Such special processing is shown, for example, in FIGS. 8 and 9 which illustrate special processing for virtual devices.

Following the step 424 is a step 426 where exclusive access to the standard logical device is disabled. Following the step 426, any subsequent writes to tracks having a set protection bit will cause the special operation to be performed as indicated by the second value provided to the header field 114 of the device table for the standard logical device. For example, if the second value provided at the step 424 indicates that the corresponding track should be copied to a track (cache slot) in the global memory, that is the operation that will be performed in connection with a write to a track with a set protection bit. Of course, the second value provided at the step 424 can indicate any one of a number of special processes to be performed in connection with the protection bit for the track being set, such as, for example, processing to be performed in connection with a snap operation. Following the step 426, processing is complete.

Just as with the flow chart 410, discussed above, in some embodiments, it may not be necessary to enable/disable exclusive access to the resources of the standard logical device used in connection with the step 424. For example, if establishing the session to an active state at the step 424 may be performed in a single unitary step (e.g., one write operation), it may not be necessary to execute the steps 422, 426. This is illustrated by alternative paths 428a, 428b shown in the flow chart 420.

Figure 13B:
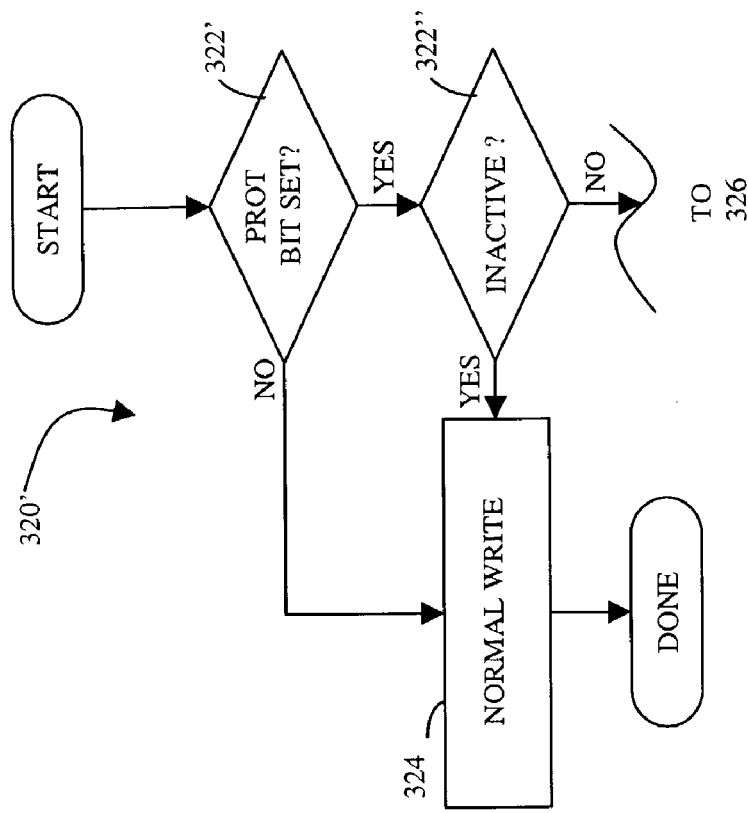
FIGS. 13A and 13B are portions of flow charts illustrating alternative processing for the flow charts of FIGS. 8 and 9, respectively, when protection bits are set according to the flow charts of FIGS. 12A, 12B, and 12C.
Figure 13A:
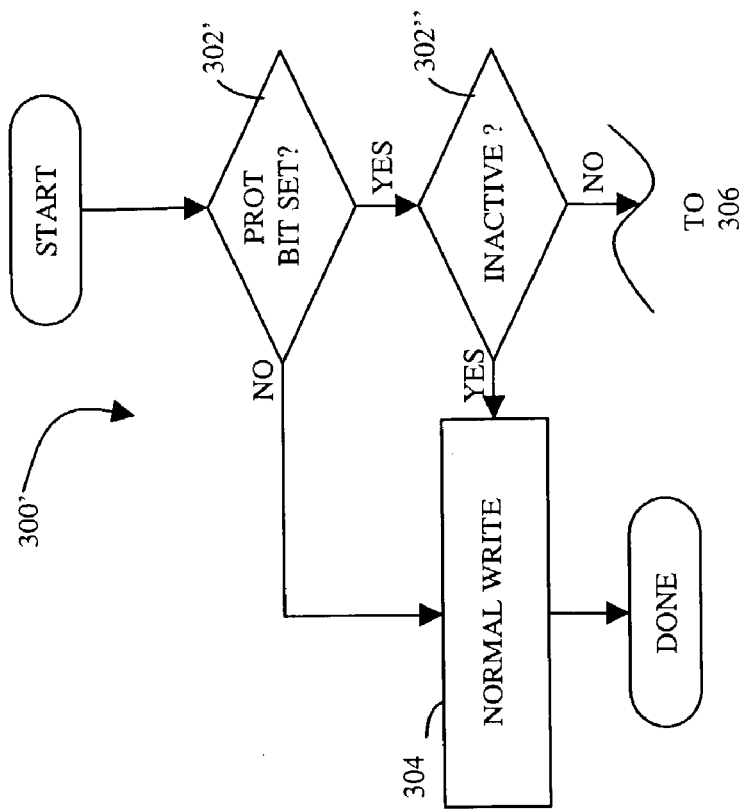

Referring to FIG. 13A, a portion of a flow chart 300' shows steps that correspond to steps of the flow chart 300 of FIG. 8. The steps of the flow chart 300' are modified to account for the use of the protection bit scheme illustrated in FIGS. 12A, 12B, and 12C and described above. A pair of steps 302', 302" replace the step 302 of the flow chart 300 of FIG. 8. The step 302' is a test step like the step 302 where it is determined if the protection bit for the track being written to is set. If not, then control passes from the step 302' to the step 304, discussed above in connection with FIG. 8, where a normal write is performed. Following the step 304, processing is complete.

If it is determined at the test step 302' that the protection bit of the track being written to is set, control passes from the step 302' to the test step 302" where it is determined if the corresponding session is inactive. As discussed above in connection with FIGS. 12A, 12B, and 12C, a session may be inactive so that no operations are performed in response to the protection bit being set. If it is determined at the test step 302" that the session is inactive, then control passes from the step 302" to the step 304, discussed above. Otherwise, control passes from the step 302" to continue on processing at the step 306, discussed above in connection with FIG. 8.

Referring to FIG. 13B, a portion of a flow chart 320' shows steps that correspond to steps of the flow chart 320 of FIG. 9 that are modified to account for the use of the protection bit scheme illustrated in FIGS. 12A, 12B, and 12C and described above. A pair of steps 322', 322" replace the step 322 of the flow chart 320 of FIG. 9. The step 322' is a test step like the step 322 where it is determined if the protection bit for the track being written to is set. If not, then control passes from the step 322' to the step 324, discussed above in connection with FIG. 9, where a normal write is performed. Following the step 324, processing is complete.

If it is determined at the test step 322' that the protection bit of the track being written to is set, control passes from the step 322' to the test step 322" where it is determined if the corresponding session is inactive. If it is determined at the test step 322" that the corresponding session is inactive, then control passes from the step 322" to the step 324, discussed above. Otherwise, control passes from the step 322" to continue on processing at the step 326, discussed above in connection with FIG. 9.

Establishing a virtual device to a standard logical device may be performed using three separate system calls. The first, Register, reserves a session number and corresponding bit position in the protection bits of the standard logical device and, for some embodiments, creates or obtains a corresponding virtual device. The second, Relate, relates a virtual device with the standard logical device by modifying the pointers for the virtual device, as described above, and also sets the protection bits of the standard logical device. The third, Activate, causes the virtual device to represent a point in time copy at the time that Activate is invoked and, in some cases, makes the virtual device ready to a host. In the case of using three system calls, the steps 214, 216, 217, 218 of FIG. 6, discussed above, may not be performed or may be performed differently, as set forth in the discussion below.

In addition, as described in more detail below, it may be possible perform the Register and Relate steps for multiple pairs of virtual devices and standard logical devices and then perform a single Activate step that causes all of the virtual devices to be established to their corresponding standard logical devices. Note also that, for purposes of the description herein, standard logical device may refer to any logical storage device generally having its own storage tracks (even if some of the tracks could be indirect at times) while virtual storage device may refer to a storage device that, by definition, uses storage tracks of other devices.

Figure 14:
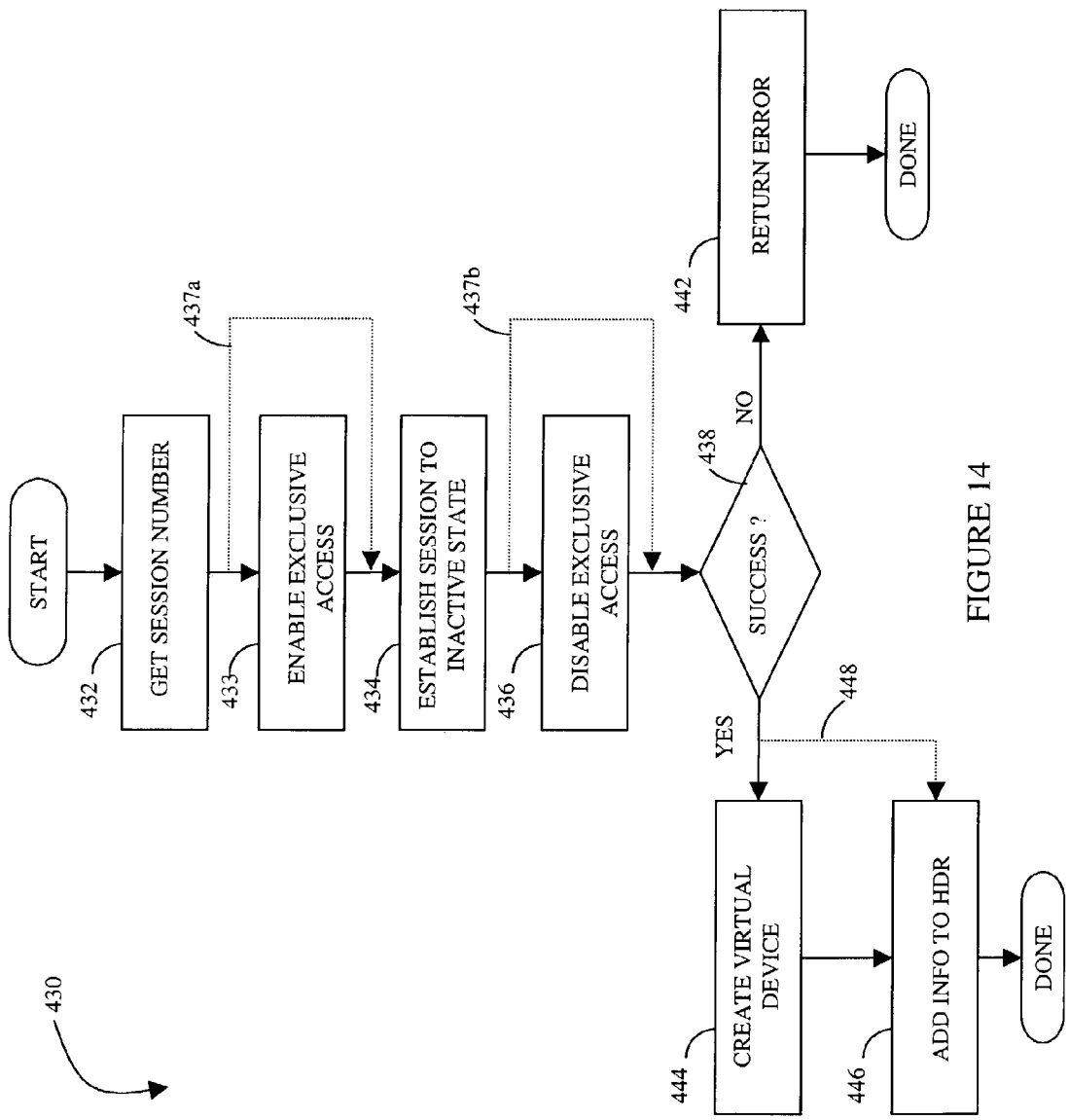
FIG. 14 is a flow chart illustrating registering a standard logical device/virtual device pair according to the system described herein.

Referring to FIG. 14, a flow chart 430 illustrates steps performed in connection with registering a standard logical device. Registering may be performed using a system call (syscall) that is passed identifiers for the standard logical device and, for some embodiments, a corresponding virtual device. In some embodiments, the Register syscall may be passed only the standard logical device and may return an identifier for a virtual device created by the Register syscall. In other embodiments, the Register syscall does not handle any virtual devices and is simply passed a standard logical device.

Processing begins at a first step 432 where a session number is reserved in a manner similar to that discussed above in connection with the step 404 of FIG. 12A. Following step 432 is a step 433 where exclusive access to appropriate resources (e.g., of the standard logical device) is enabled in a manner similar to that discussed above in connection with FIGS. 12B and 12C. Following the step 433 is a step 434 where the corresponding session is established to an inactive state in a manner similar to that discussed above in connection with the step 414 of FIG. 12B. Following the step 434 is a step 436 where exclusive access to appropriate resources is disabled in a manner similar to that discussed above. Note that establishing the session to an inactive state does not alter write processing to the standard logical device. Note also that, just as with FIGS. 12B and 12C, for some embodiments it may not be necessary to enable and disable exclusive access to the resources used in connection with the step 434. This is illustrated by alternative paths 437a, 437b.

Following the step 436 is a test step 438 which determines if the operations performed at the previous steps 432–434, 436 were successful. The operations may not have been successful for a variety of reasons including, for example, the fact that all of the protection bits for the standard logical device have already been used for other purposes. In an embodiment illustrated herein, there are sixteen protection bits. Thus, if prior to executing step 432, all sixteen protection bits for the standard logical device are being used, then the result at the test step 438 will indicate that the previous operations were not successful. If it is determined at the test step 438 that the previous operations were not successful, control passes from the step 438 to a step 442 where an error is returned. Following step 442, processing is complete.

If it is determined at the test step 438 that the previous operations were successful, then control passes from the step 438 to a step 444 where the virtual device is created. In some embodiments, the virtual device is created at the step 444 and passed back to the caller of the Register routine. In other embodiments, the virtual device may exist prior to invoking the Register routine, in which case there is no need to create a new virtual device at the step 444. In still other embodiments (discussed below), the Register routine does not handle (i.e., create or get passed) any virtual devices. Rather, the virtual device may be created or obtained in a separate step either before or after the Register routine, such as in connection with a Relate routine (described below), or as part of a general system configuration.

Following step 444 is a step 446 where information regarding the standard logical device (and perhaps a virtual device, if one is created and/or used in connection with the Register routine) is placed in the header of the device table for the standard logical device. Providing the information in the header of the device table of the standard logical device facilitates processing later on once the standard logical device and a corresponding virtual device is activated (described below). In some embodiments, it may be useful to enable exclusive access to appropriate resources of the standard logical device prior to placing the information in the header. Following the step 446, processing is complete.

Note that the processing illustrated in the flow chart 430 does not cause any virtual device to be a point in time copy of the standard logical device and does not make any virtual device accessible. The Register routine illustrated by the flow chart 430 corresponds to preliminary operations that facilitate later activation of a standard logical device/virtual device pair. Note also an alternative path 448 from the step 438 to the step 446 illustrates embodiments where the Register routine does not cause any virtual device to be created. Thus, if the Register routine does not handle virtual devices, then control passes from the test step 438 directly to the step 446 via the path 448 if the Register operation was successful.

Figure 15:
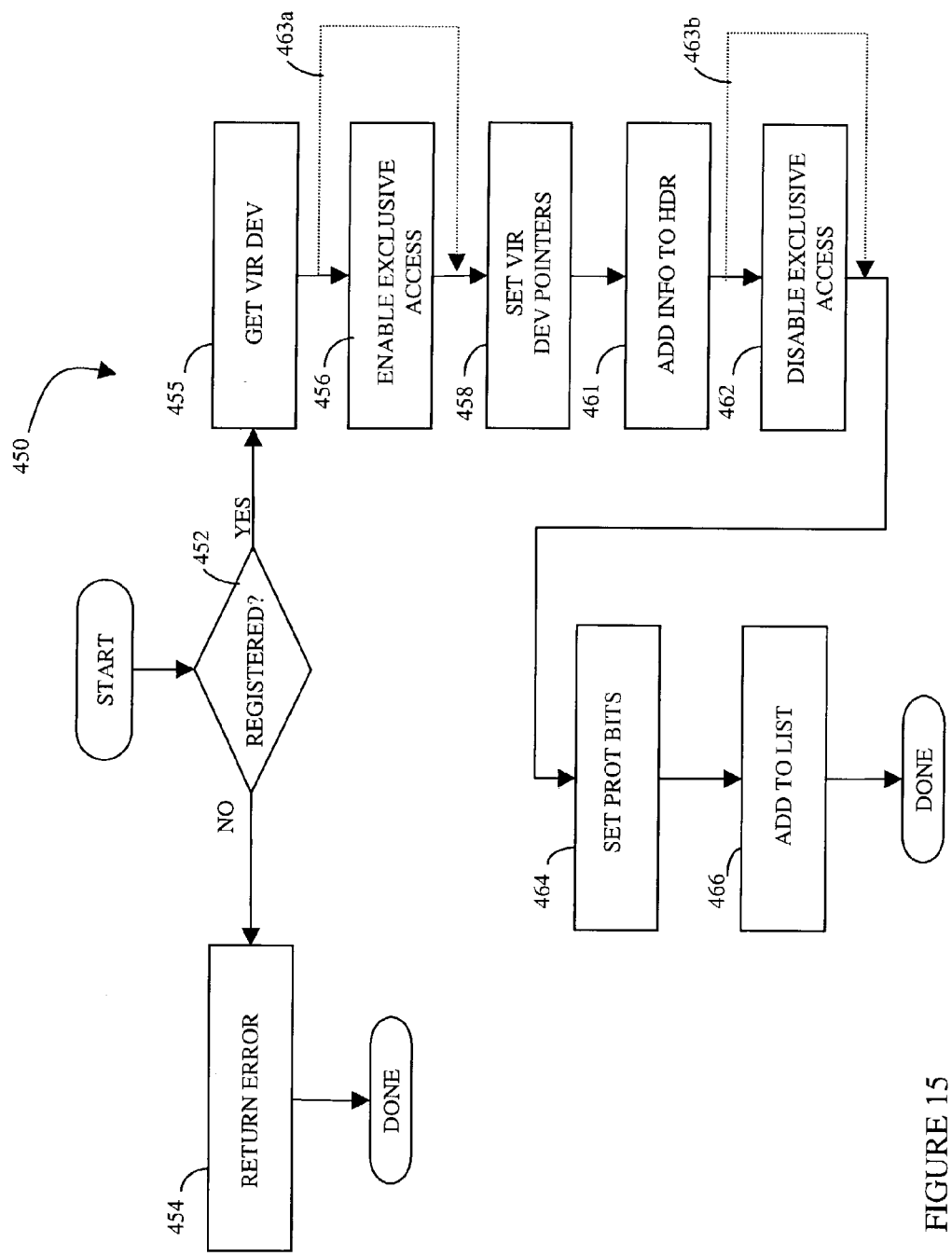
FIG. 15 is a flow chart illustrating relating a standard logical device to a virtual device according to the system described herein.

Referring to FIG. 15, a flow chart 450 illustrates steps performed in connection with relating a virtual device to a standard logical device. Just with the Register routine, the Relate routine is part of the preliminary processing that is performed prior to activation and use of a standard logical device/virtual device pair. Relating may be performed by making a system call in which the parameters are the standard logical device and, for some embodiments, a corresponding virtual device (passed, for example, by a host). In other embodiments, the Relate routine may cause a virtual device to be created (e.g., by calling a separate create routine) or may simply obtain a preexisting unused virtual device that is provided in connection with system configuration or provided by some other means. In those embodiments, the Relate routine may be passed a pointer to storage that the Relate routine uses to place an identifier for the newly created/obtained virtual device.

Processing begins at a first test step 452 where it is determined if the standard logical device being related has been previously registered. Note that the Relate routine may not be called for a standard logical device unless the standard logical device has been previously registered. If the standard logical device has not been registered, then control passes from the step 452 to a step 454 wherein an error is returned. Following the step 454, processing is complete. Note that the step 454 (and other error steps described herein) may actually refer to separate error processing that does something different than report errors. For example, the processing performed at the step 454 may include measure taken to correct an error and continue processing.

If it is determined that the test step 452 that the standard logical device has been registered, then control passes from the step 452 to a step 455 where a virtual device is obtained for pairing with the standard logical device. In some embodiments, the virtual device is created or obtained in connection with the Register routine (or at least before the Relate routine is called), in which case the step 455 may represent the Relate routine being passed the virtual device previously created (by, for example, a host) or obtained and an identifier for the virtual device is passed back to the calling routine. In other embodiments, the virtual device is created or obtained by the Relate routine at the step 455. Following the step 455 is a step 456 where exclusive access to appropriate resources (e.g., the standard logical device) is enabled in a manner similar to that discussed above in connection with FIGS. 12B and 12C. Following the step 456 is a step 458 where all the pointers in the device table for the virtual device are made to point to corresponding tracks of the standard logical device. The processing performed at the step 458 is analogous to the pointer modifications provided at the step 216 of the flow chart 210 of FIG. 6, discussed above. Following the step 458 is a step 461 where information about the standard logical device/virtual device pair is placed in the headers of both the standard logical device and the virtual device. This information is used in connection with subsequent accesses for the devices, as described elsewhere herein. Following the step 461 is a step 462 where exclusive access to appropriate resources is disabled in a manner similar to that discussed above. In some embodiments, exclusive access may be enabled prior to placing the information in the header and may be disabled after the information is placed therein. Note that, just as with FIGS. 12B and 12C, for some embodiments it may not be necessary to enable and disable exclusive access to the resources used in connection with the step 458 and/or the step 461. This is illustrated by alternative paths 463a, 463b.

Following the step 462 is a step 464 where the protection bits for the standard logical device are set, thus indicating special processing to be performed when a write is provided to a track of the standard logical device. Note, however, that when the protection bits are set at the step 464, no special processing will take place upon writes to the tracks of the standard logical device because, as discussed above, the session is initially inactive. Thus, even though a protection bit may have been set for a track at the step 464, writes to the standard logical device will cause no special processing is to be performed because the session is inactive. This is illustrated above in connection with the steps 302″ and 322″ of FIG. 13A and FIG. 13B.

Following the step 464 is a step 466 where the standard logical device/virtual device pair is added to a list. As discussed in more detail below, it is possible to activate a plurality of standard logical device/virtual device pairs with one call. The list used at the step 466 contains a list related pairs that have not yet been activated. As discussed in more detail below, the list is used by the Activation routine. Alternatively, the Relate routine may return the standard logical device/virtual device pair (or just the virtual device or just the standard logical device) to the calling routine (e.g., a host application) that maintains the list. Alternatively still, the Relate routine may be passed a list identifier, which is used by the Relate routine to determine a particular list to which the standard logical device/virtual device pair is to be added. In that case, it may be useful to have a separate routine that creates the list identifiers and/or list structures/ storage and which maintains the lists. In instances where the list and/or list id is a passed parameter, it may be possible for the calling routine to maintain more than one list. The Relate routine may create the list after being passed a plurality of standard logical devices and, optionally, a corresponding plurality of virtual devices. In that case, the Relate routine may pass back the list that is created.

Figure 16A:
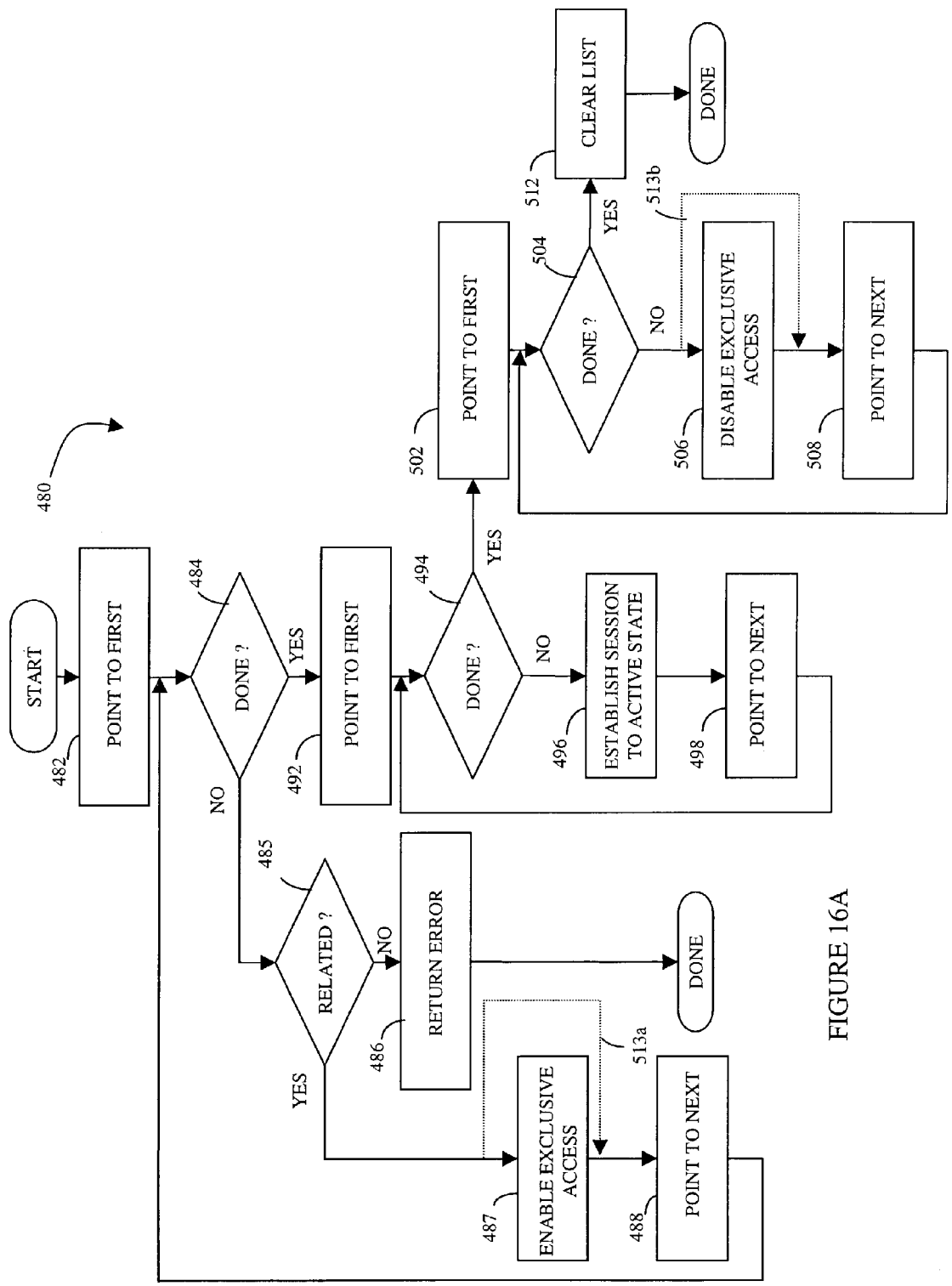
FIG. 16A is a flow chart illustrating steps performed in connection with activation of one or more standard logical device/virtual device pairs according to the system described herein.

Referring to FIG. 16A, a flow chart 480 illustrates steps performed in connection with the Activate routine that activates one or more standard logical device/virtual device pairs. Prior to activation, an unused virtual device is not ready to any host. However, in the course of activation, a virtual device is made ready to one or more hosts.

Processing begins at a first step 482 where a pointer is set to point to the first item on a list like the list described above in connection with the step 466 of the flow chart 450. The pointer is used to point to various elements on the list. The list may be passed as a parameter to the Activate routine. Alternatively, a list id may be passed where the list id is used by the Activate routine to distinguish between lists to which the Activate routine has access. Alternatively still, the Relate and Activate routines may use a single global list so that any call to the Activate routine causes all previously-related standard logical device/virtual device pairs to be activated. Of course, instead of a formal list structure, it may be possible to pass each of the standard logical device/virtual device pairs as parameters to the Activate routine.

Following the step 482 is a test step 484 where it is determined if processing is complete (i.e. if the end of the list has been reached). This may be determined by examining the pointer used to iterate through the list. If processing of the list is not complete, then control passes from the step 484 to a step 485, which determines if the Relate operation was previously performed on the standard logical device/ virtual device pair indicated by the pointer. If the Relate operation was not previously performed (and thus no activation is possible), then control transfers from the step 485 to a step 486 where an error is returned. Following the step 486, processing is complete.

If it is determined at the step 485 that the Relate routine was performed on the standard logical device/virtual device pair being activated, then control transfers from the step 485 to a step 487 where exclusive access to appropriate resources (e.g., the standard logical device) is enabled in a manner similar to that discussed above in connection with FIGS. 12B and 12C. Following the step 487 is a step 488 where the pointer is made to point to the next standard logical device/virtual device pair on the list. Following the step 488, control transfers back to the test step 484 to determine if processing of the list is complete.

If it is determined at the test step 484 that processing of the list is complete (and thus all standard logical devices corresponding to virtual devices to be activated have been determined to have been previously related), control passes from the step 484 to a step 492 where the pointer that keeps track of elements on the list is made to point to the first item in the list of standard logical device/virtual device pairs. Following the step 492 is a test step 494 where it is determined if the entire list has been processed. If not, then control transfers from the step 494 to a step 496 to activate the session corresponding to the protection bit that has been set for the standard logical device/virtual device pair. Activating the session at the step 496 is analogous to the processing performed at the step 424 in the flow chart 420, of FIG. 12C, discussed above. Activating the session at the step 496 causes the special virtual device processing, discussed elsewhere herein, to be performed when a write occurs to a track of the standard logical device having a set protection bit. In addition, activating a session makes the virtual device ready to a host. Following the step 496 is a step 498 where the pointer that is keeping track of the processed items on the list is made to point to the next item. Following the step 498, control transfers back to the test step 494.

If it is determined at the test step 494 that the entire list of standard logical device/virtual device pairs has been processed (so that all standard logical devices corresponding to virtual devices being activated have had the corresponding sessions made active), control transfers from the step 494 to a step 502 where the pointer is made to point to the first standard logical device/virtual device pair in the list. Following the step 502 is a step 504 where it is determined if the entire list has been processed. If is determined that the entire list has been processed, control transfers from the step 504 to a step 506 where exclusive access to appropriate resources (obtained at the step 487) is disabled in a manner similar to that discussed above. Following the step 506 is a step 508 where the pointer is made to point to the next item on the list. Following the step 508, control transfers back to the test step 504 to determine if the end of the list has been reached.

If it is determined at the test step 504 that the end of the list has been reached, control transfers from the step 504 to a step 512 where the list is cleared so that a subsequent call to the Activate routine will not attempt to reactivate already activated standard logical device/virtual device pairs. Following the step 512, processing is complete. Note that, just as with FIGS. 12B and 12C, for some embodiments it may not be necessary to enable and disable exclusive access to the resources used in connection with the steps 487, 506. This is illustrated by alternative paths 513a, 513b.

Note that, in some instances, exclusive access for some standard logical devices of a list may have been enabled at the step 487 prior to one of the devices on the list causing an error at the step 485. In those cases, prior to execution of the step 486, the standard logical devices to which exclusive access has already been enabled have exclusive access thereto disabled in a manner similar to that illustrated above in connection with the steps 502, 504, 506, 508.

In some embodiments, it may be possible to not use a list at the step 466 of FIG. 15 for keeping track of the standard logical device/virtual device pairs. Instead, the Activate routine could be called by passing the various standard logical device/virtual device pairs directly thereto. In that case, the list used in the processing illustrated by the flow chart 480 of FIG. 16A would be the list of parameters passed to the Activate routine.

In other embodiments, it may be possible to provide additional calls such as Begin Group and Process Group where a Begin Group call is provided prior to a plurality of Relate calls (or Register and Relate calls). Then, when it is time to activate the various standard logical device/virtual device pairs that were registered and related after the Begin Group call, the call to Process Group is made. The Process Group call, in effect, activates all of the standard logical device/virtual device pairs that were registered and related after the Begin Group call. Such embodiments may use the list, discussed above in connection with FIGS. 15 and 16A, where a Begin Group call causes creation of a new, empty, list and a Process Group call causes the processing shown in the flow chart 480 of FIG. 16A to be performed. In such a system, a Relate call that is not bracketed by a Begin Group/Process Group pair (i.e. a Relate that is not called after a Begin Group call) could cause the Activate to be executed immediately after the relate is successfully completed. That is, any Register call and Relate call for a standard logical device/virtual device pair that is not after a Begin Group call may cause automatic activation of the standard logical device/virtual device pair. In other embodiments, the Activate call would not be automatic. Note also that, in some embodiments, it may be possible to use multiple lists to separately activate different sets of standard logical device/virtual device pairs. In those cases, the specific list may be a parameter passed to a Process Group call, which could then be passed on, in some fashion, to the Activate routine.

In some embodiments, any one of the Register, Relate and/or Activate calls may include optional parameters for modifying the device name (or other device identifiers) for the virtual device. This may be useful in operating systems where it is impermissible to have two devices that have exactly the same name and/or device identifiers. If a virtual device is a copy of a standard logical device, it may be necessary to change the name of the virtual device. In addition, in some embodiments, it may be possible to have an optional parameter indicating whether the virtual device will be on line or off line upon activation. In some operating systems, an on-line device is accessible to a host (ready to the host) while an off-line device (not ready to a host) is not. Thus, for host applications that wish to create a virtual device but do not wish to permit access thereto, it may be possible to pass a parameter to any one of the Register, Relate and/or Activate calls to indicate that the virtual device is to be on line or off line upon activation.

Figure 16B:
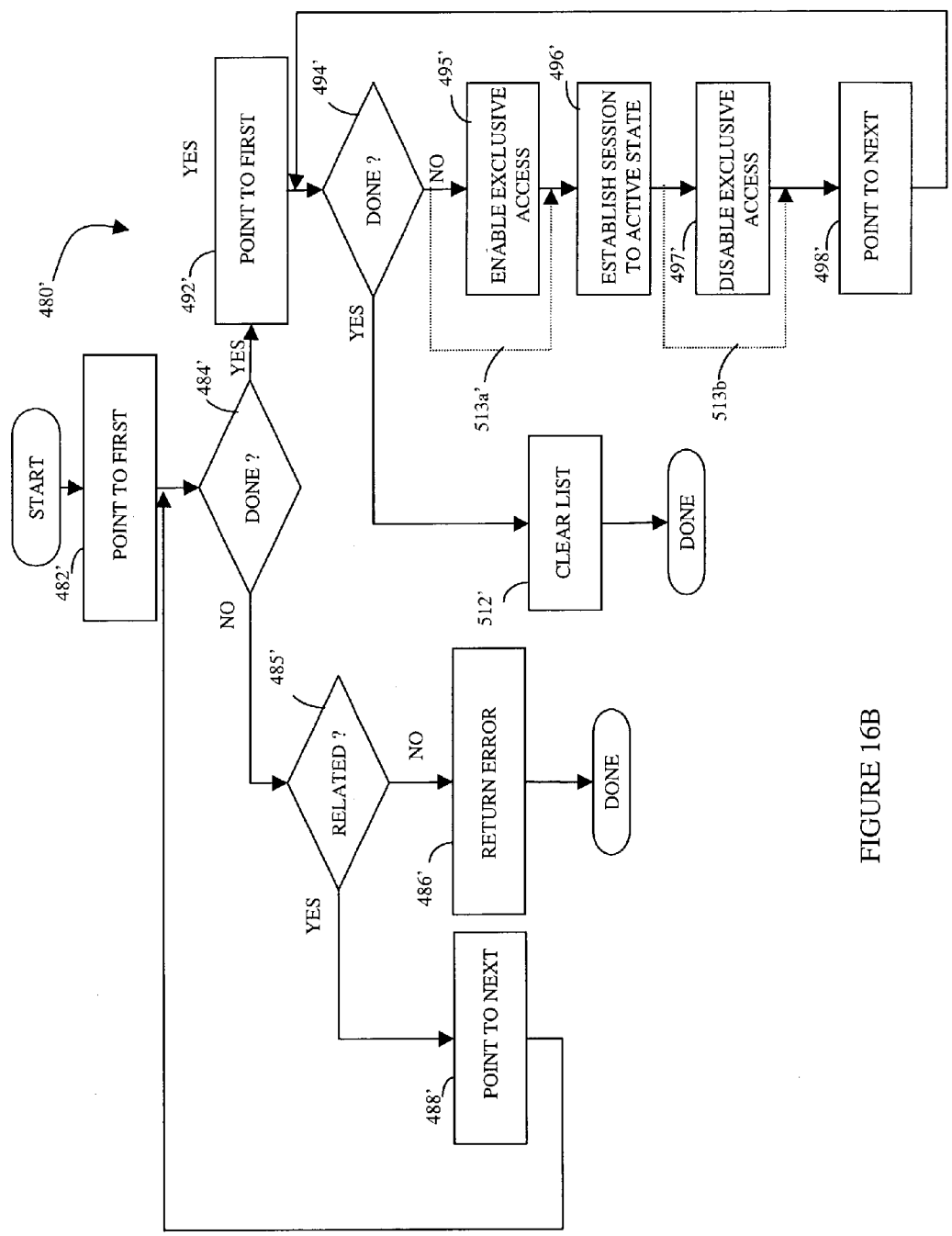
FIG. 16B is a flow chart illustrating steps performed in connection with activation of one or more standard logical device/virtual device pairs according to another embodiment of the system described herein.

Referring to FIG. 16B, a flow chart 480' illustrates steps performed in connection with an alternative embodiment for the Activate routine that activates one or more standard logical device/virtual device pairs. Processing begins at a first step 482' where a pointer is set to point to the first item on a list like the list described above in connection with the step 466 of the flow chart 450. The pointer is used to point to various elements on the list. The list may be passed as a parameter to the Activate routine. Alternatively, a list id may be passed where the list id is used by the Activate routine to distinguish between lists to which the Activate routine has access. Alternatively still, the Relate and Activate routines may use a single global list so that any call to the Activate routine causes all previously-related standard logical device/virtual device pairs to be activated. Of course, instead of a formal list structure, it may be possible to pass each of the standard logical device/virtual device pairs (or only one pair) as parameters to the Activate routine.

Following the step 482' is a test step 484' where it is determined if processing is complete (i.e. if the end of the list has been reached). This may be determined by examining the pointer used to iterate through the list. If processing of the list is not complete, then control passes from the step 484' to a step 485', which determines if the Relate operation was previously performed on the standard logical device/virtual device pair indicated by the pointer. If the Relate operation was not previously performed (and thus no activation is possible), then control transfers from the step 485' to a step 486' where an error is returned. Following the step 486', processing is complete.

If it is determined at the step 485' that the Relate routine was performed on the standard logical device/virtual device pair being activated, then control transfers from the step 485' to a step 488' where the pointer is made to point to the next standard logical device/virtual device pair on the list. Following the step 488', control transfers back to the test step 484' to determine if processing of the list is complete.

If it is determined at the test step 484' that processing of the list is complete (and thus all standard logical devices corresponding to virtual devices to be activated have been reviewed), control passes from the step 484' to a step 492' where the pointer that keeps track of elements on the list is made to point to the first item in the list of standard logical device/virtual device pairs. Following the step 492' is a test step 494' where it is determined if the entire list has been processed. If not, then control transfers from the step 494' to a step 495' where exclusive access to appropriate resources (e.g., the standard logical device) is enabled in a manner similar to that discussed above in connection with FIGS. 12B and 12C. Following the step 495' is a step 496' which activates the session corresponding to the protection bit that has been set for the standard logical device/virtual device pair. Activation the session at the step 496' is analogous to the processing performed at the step 424 in the flow chart 420, of FIG. 12C, discussed above. Activating the session at the step 496' causes the special virtual device processing, discussed elsewhere herein, to be performed when a write occurs to a track of the standard logical device having a set protection bit. Following the step 496' is a step 497' where exclusive access to appropriate resources is disabled in a manner similar to that discussed above. Following the step 497' is a step 498' where the pointer that is keeping track of the processed items on the list is made to point to the next item. Following the step 498', control transfers back to the test step 494'.

If it is determined at the test step 494' that the entire list of standard logical device/virtual device pairs has been processed (so that all standard logical devices corresponding to virtual devices being activated have had the corresponding sessions made active), control transfers from the step 494' to a step 512' where the list is cleared so that a subsequent call to the Activate routine will not attempt to reactivate already activated standard logical device/virtual device pairs. Following the step 512', processing is complete. Note that, just as with FIGS. 12B and 12C, for some embodiments it may not be necessary to enable and disable exclusive access to the resources used in connection with the step 496'. This is illustrated by alternative paths 513a', 513b'.

The alternative embodiment illustrated by the flow chart 480' of FIG. 16B may be used in instances where it is not essential that all standard logical device/virtual device pairs be activated synchronously and/or in instances where a host application performs processing to synchronize activations when necessary. Different options for host application processing that may be used with FIG. 16B (or FIG. 16A) is discussed elsewhere herein.

In some instances, it may be desirable to restore a virtual device back to the corresponding standard logical device or to another standard logical device. That is, it may be useful to convert the virtual device to an actual logical device with its own data storage or transfer a virtual device to another virtual device.

Figure 17C:
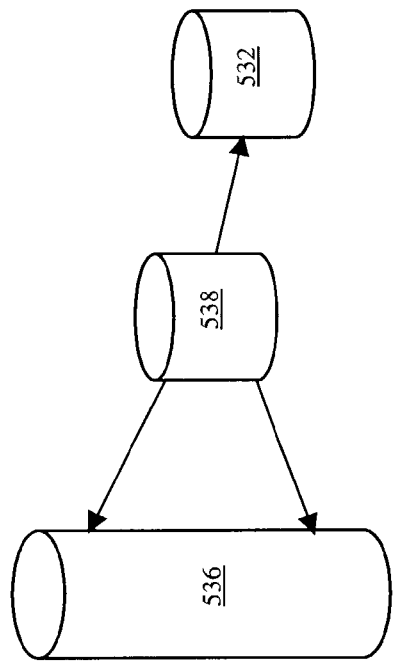
FIGS. 17A, 17B, 17C, 17D, and 17E illustrate different ways to restore a virtual device to a standard logical device or another virtual device according to the system described herein.
Figure 17B:
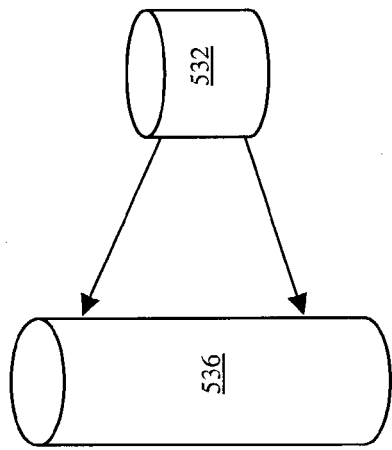
Figure 17A:
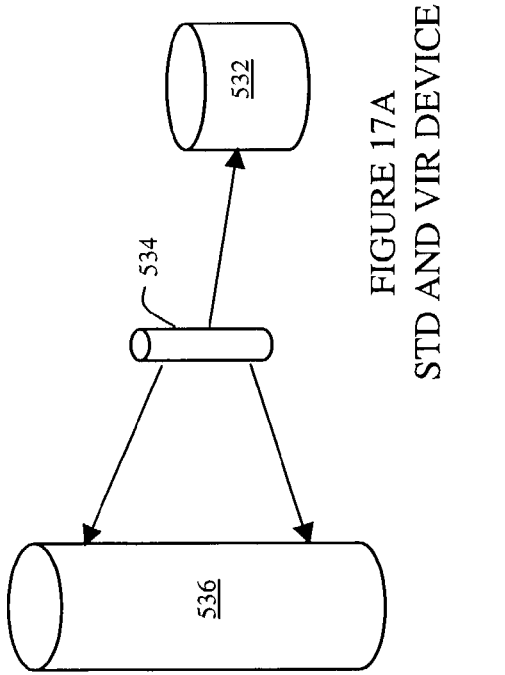

Referring to FIG. 17A, a standard logical device 532 is shown as corresponding to a virtual device 534 and a global memory 536 where it is desirable to restore the virtual device 534 to a logical device having its own storage. Note that, in the example of FIG. 20A, some tracks of the standard logical device 532 that are pointed to by the virtual device 534 have not changed since the virtual device 534 was established. Other tracks of the global memory 536 that are pointed to by the virtual device 534 correspond to tracks of the standard logical device 532 that have changed since the virtual device 534 was established.

Referring to FIG. 17B, the results of restoring the virtual device 534 to the standard logical device 532 of FIG. 17A (the old std dev) are shown. The virtual device 534 has been eliminated. In addition, for any tracks of the standard logical device 532 that are pointed to by the virtual device 534, no special processing has been performed. However, for tracks of the global memory 536 that are pointed to by the virtual device 534, the corresponding tracks of the standard logical device 532 are modified to point to the corresponding tracks (cache slots) of the global memory 536. Thus, a host accessing the standard logical device 532 will, in effect, access the data on the track of the global memory 536. This indirection mechanism provides a way to restore the standard logical device 532 without having to immediately move all of the data from the global memory 536 to the standard logical device 532. In an embodiment herein, the appropriate tracks of a standard logical device 532 are made to point to corresponding tracks (cache slots) of a global memory 536 and, in addition, a background copy process copies to the standard logical device 532 any tracks that are pointed to by the standard logical device 532. If a cache slot mechanism is used, the cache slots of the global memory 536 may be destaged to the standard logical device 532 in a conventional fashion.

In an embodiment herein, the background copy process (e.g., mark for destaging) is designed to not appreciably interfere with normal access of the standard logical device 532. In addition, in the case of accessing a track of the standard logical device 532 that points to a track of the global memory 536, a copy is also performed when the track is accessed rather than waiting for the background task to copy the track. Note that when a virtual device is restored to the standard logical device to which the virtual device was established, there are no other virtual devices established to the standard logical device. However, for other types of restore, discussed below, there may be more than one virtual device established to a standard logical device prior to restoring the virtual device to another standard logical device or to another virtual device.

Referring to FIG. 17C, another type of restore is illustrated where the data represented by the virtual device 534 of FIG. 17A is copied to a new standard logical device 538. In that case, the new standard logical device 538 consists entirely of indirect tracks that point to either the standard logical device 532 in instances where the virtual device 534 previously pointed to the standard logical device 532 or, alternatively, point to the global memory 536 in instances where the virtual device 534 previously pointed to the global memory 536. As in the embodiment illustrated in FIG. 17B, a background copy task (e.g., mark cache slots for destaging) may be used to copy data from the standard logical device 532 and the global memory 536 to the tracks of the standard logical device 538 so that, eventually, the standard logical device 538 will not contain any indirect tracks from the restore operation. Also, as in the embodiment of FIG. 17B, access to a particular track of the standard logical device 538 may cause that track to be copied in connection with the access rather than waiting for the background copy to move the track.

Figure 17D:
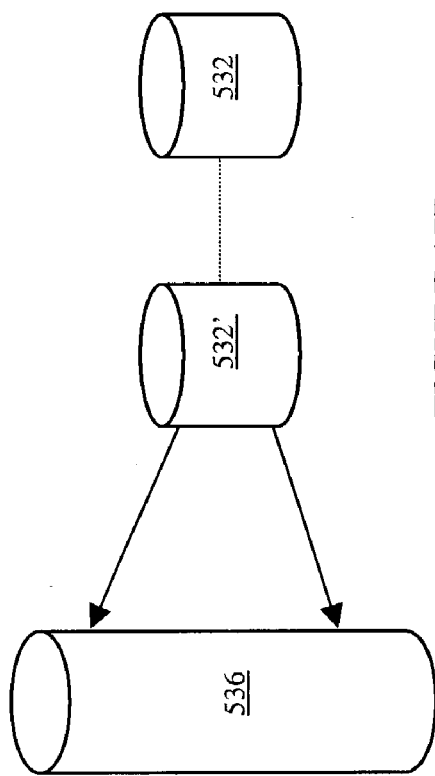

Referring to FIG. 17D, a mirror logical device 532' is a logical volume that represents a point in time copy of the standard logical device 532. Like the standard logical device 532, the mirror logical device 532' contains its own storage for tracks of data. In an embodiment herein, the mirror logical device 532' is first established to the standard logical device 532, which initially causes data to be copied from the standard logical device 532 to the mirror logical device 532'. Once the initial copying is complete, the logical devices 532, 532' are "synced". Write operations performed to the standard logical device 532 are also performed to corresponding tracks of the mirror logical device 532'. Any read operations for a track not in cache may be performed to either of the devices 532, 532'.

After the mirror logical device 532' has been established to the standard logical device 532, it is possible to "split" the devices 532, 532' so that operations performed on one of the devices 532, 532' (e.g., writes) are not automatically performed on the other one of the devices 532, 532'. However, even after splitting the devices 532, 532', there may be a mechanism that keeps track of the changes that occur after the split so that, for example, it is possible to resync the devices 532, 532' after a split without having to copy all of the data from the standard logical device 532 to the mirror logical device 532'.

In the embodiment illustrated by FIG. 17D, the mirror logical device 532' was split from the standard logical device 532 after the virtual device 534 was established to the standard logical device 532. In this case, restoring the virtual device 534 to the mirror logical device 532' is like restoring the virtual device to the standard logical device 532 as shown in FIG. 17B, where tracks of the mirror logical device 532' that have changed after the virtual device 534 was established are made to be indirect pointers to tracks of the global memory 536 and tracks that did not change after the virtual device 534 was established may be accessed directly on the mirror logical device 532'. This is explained in more detail below. Note that the embodiment of FIG. 17D exhibits the advantages of the embodiment of FIG. 17B (less indirection and less background copying) and the advantages of the embodiment of FIG. 17C (standard logical device 532 is not modified to perform the restore).

Figure 17E:
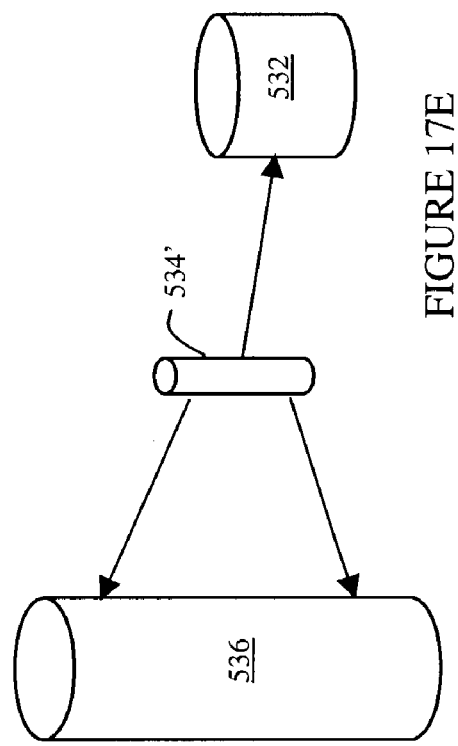

Referring to FIG. 17E, the virtual device 534 is restored to a new virtual device 534'. In this case, the new virtual device 534' is essentially a copy of the original virtual device 534, with pointers to the standard logical device 532 and the global memory 536.

In some embodiments, it may be possible to provide an optional parameter for restoring that allows changing the name of the device to which the virtual device is being restored in connection with the restoration. Similarly, an optional parameter may be used so that the device to which the virtual device is being restored may be made on line or off line. In addition, it may be possible to restore multiple devices synchronously using Begin Group and Process Group commands similar to those discussed above in connection with establishing virtual devices.

Figure 18:
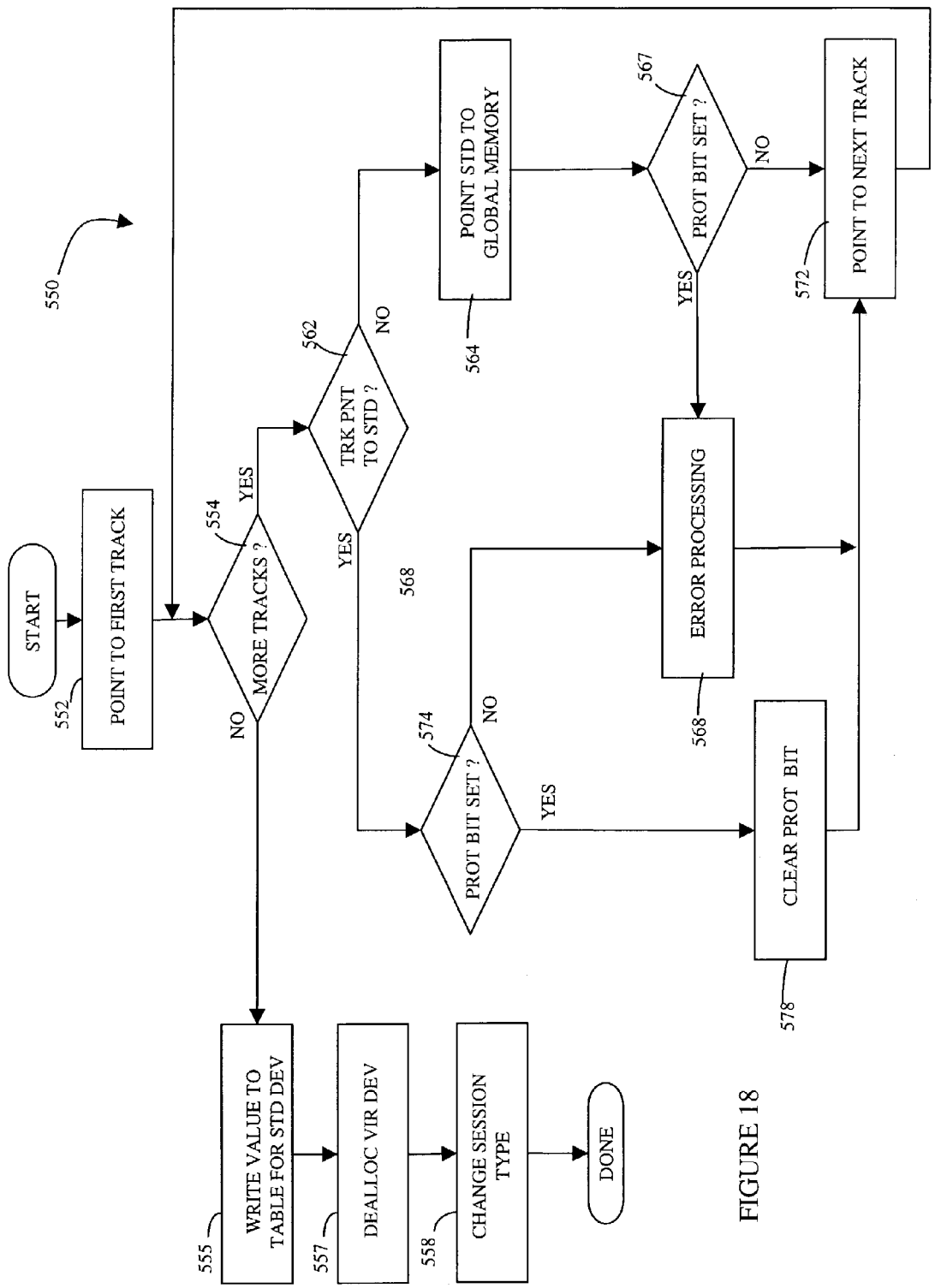
FIG. 18 is a flow chart that illustrates steps performed to restore a virtual logical device to a standard logical device according to a first embodiment of the system described herein.

Referring to FIG. 18, a flow chart 550 illustrates steps performed in connection with performing a restore like that illustrated in FIG. 17B and discussed above where a virtual device is restored to a standard logical device to which the virtual device was previously established. Processing begins at a first step 552 where the first track of the virtual device is pointed to. A pointer is used to iterate through and process each track of the virtual device. Following step 552 is a test step 554, which determines if there are more tracks to be processed. If not, then control transfers from the step 554 to a step 555 where a value indicating that a restore has been performed for the standard logical device is written to a portion of the header field of the device table corresponding to the session that had been used for the virtual device. Following the step 555 is a step 557 where the virtual device is deallocated in a manner similar to that described above in connection with FIG. 11.

Following step 557, is a step 558 where the session type is changed. In an embodiment herein, the session type is changed at the step 558 to indicate that the standard logical device has tracks thereon that indirectly point to tracks of the global memory (explained in more detail below). For this session type, tracks are gradually migrated from the global memory to the standard logical device. This migration may be performed by a system-wide task that resolves indirect tracks for the session type set at the step 558. Alternatively, it is also possible to explicitly start a background copy task (like a background copy that might be used in a snap operation). The background copy task resolves indirect pointers by copying data from tracks of the global memory to the standard logical device. A cache slot destaging mechanism may be used. Note that, as tracks are moved to the standard logical device from the global memory, tracks (cache slots) of the global memory are released. Note also that if a write occurs to an indirect track of the standard logical device that points to a track of the global memory, the track containing the data is first copied from the global memory to the standard logical device (and possibly released) prior to the write being executed. In other embodiments, writes to an indirect track where the data is in the global memory may cause the write to be executed directly to the track of the global memory. Following the step 558, processing is complete.

If it is determined that the test step 554 that there are more tracks to be processed, then control passes from the step 554 to a test step 562 where it is determined that if the virtual device track being processed points to the standard logical device. If not (meaning that the track of the virtual device points to the global memory), then control transfers from the step 562 to a step 564 where the track of the standard logical device is made to point to the corresponding track of the global memory. In that way, a subsequent access to the track of the standard logical device will fetch the data stored on the track of the global memory. However, as discussed above, the tracks will be migrated from the global memory to the standard logical device so that, eventually, the standard logical device will contain the data that is initially provided in the global memory. Note that accessing and modifying tracks of a storage device as discussed herein may require inhibiting access by other processes by, for example, locking the tracks prior to determining the state thereof and/or prior to modifying the tracks. Steps for inhibiting access by other processes are not explicitly shown herein, but it is understood that such steps will be performed when needed.

Following the step 564 is a step 567 where it is determined if the protection bit for the track is set. Since the track of the virtual device points to the global memory, it is expected that the protection bit would be clear at this step, in accordance with other processing discussed herein. Thus, if it is determined at the step 567 that the protection bit for the track is set, control passes from the step 567 to a step 568, where error processing is performed. The error processing may include simply logging the error, suspending processing and returning an error indicator, taking steps to correct the error, etc.

If it is determined at the step 567 that the protection bit for the track is not set, or following the step 568, control transfers to a step 572 where the next track of the virtual device is pointed to in order to perform the processing described herein. Following the step 572, control transfers back to the test step 554, discussed above.

If it is determined at the test step 562 that the virtual device track being processed points to the standard logical device, control transfers from the step 562 to a step 574, where it is determined if the protection bit for the track is set. In accordance with other processing discussed herein, it is expected that the protection bit would be set if the virtual device track (table) points to the standard logical device. Thus, if it is determined at the step 574 that the protection bit is not set, control transfers from the step 574 to the step 568, discussed above.

If it is determined at the step 574 that the protection bit is set (as expected), control transfers from the step 574 to a step 578, where the protection bit is cleared so that no special processing will be performed on behalf of the previous standard logical device/virtual device session in connection a write to the track of the standard logical device. Note however that, as discussed below, other types of restore operations may require special processing in connection with writes to tracks of the standard logical device. Following the step 578, control transfers to the step 572 to process the next track.

Figure 19:
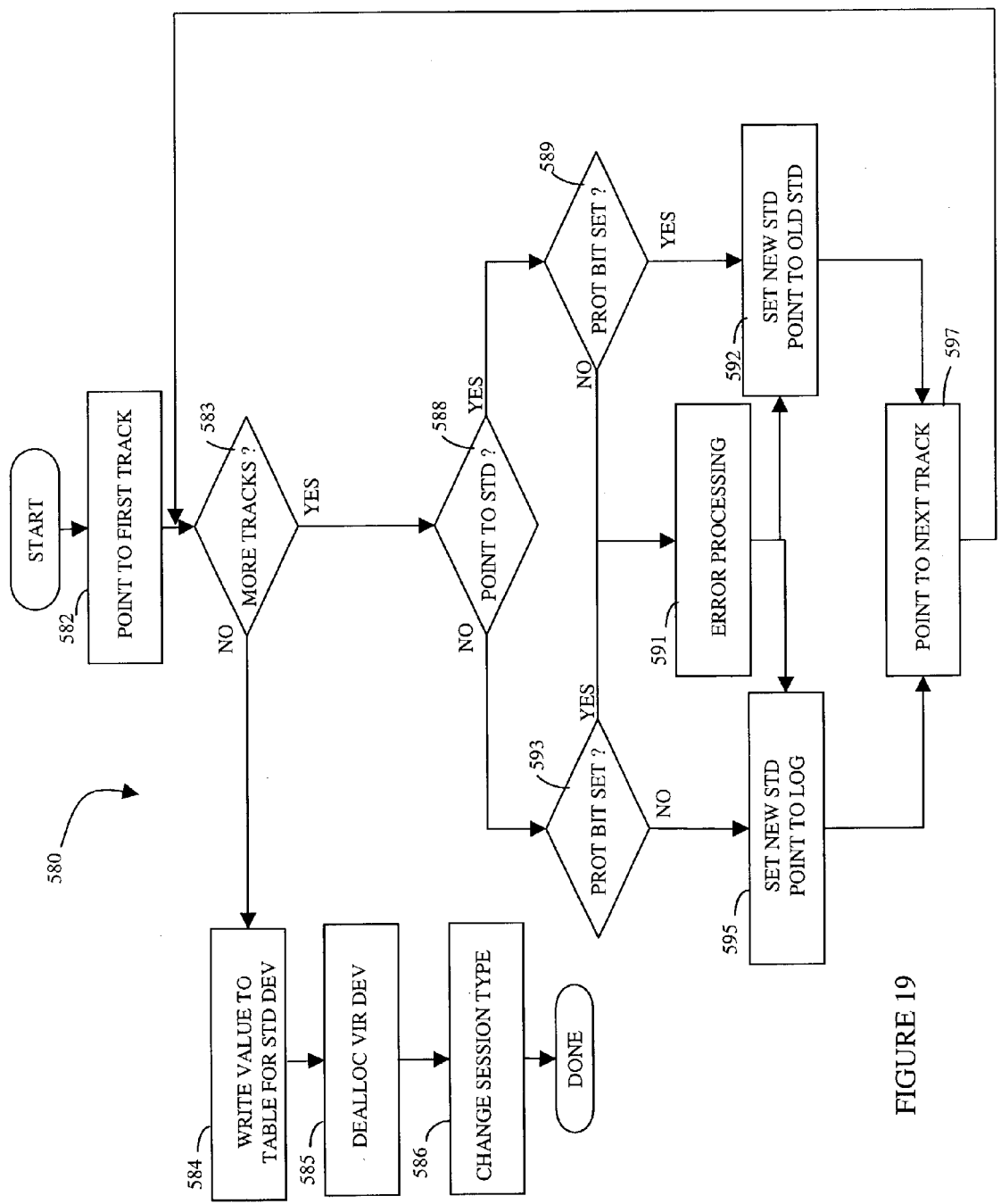
FIG. 19 is a flow chart that illustrates steps performed to restore a virtual logical device to a standard logical device according to a second embodiment of the system described herein.

Referring to FIG. 19, a flow chart 580 illustrates steps performed in connection with restoring a virtual device to a new standard logical device as illustrated in FIG. 17C and discussed above. Processing begins at a first step 582 where a first track of the virtual device is pointed to. Following step 582 is a test step 583 where it is determined if there are more tracks of the virtual device to be processed. If not, then control transfers from the step 583 to a step 584 where a value that indicates that a restore has been performed for the virtual device is written to a portion of the header field of the device table of the standard logical device corresponding to the session that had been used for the virtual device in a manner similar to that discussed above in connection with the step 555. Note, however, that in the case of the flow chart 580, there is no corresponding step for clearing all of the protection bits. This is because, as discussed in more detail below, the protection bits are used after the restore in this embodiment.

Following the step 584 is a step 585 where the virtual device is deallocated in a manner similar to that described above in connection with FIG. 18. Following the step 585 is a step 586 where the session type is changed to facilitate migrating tracks in a manner similar to that discussed above in connection with the step 558. Note in this case, however, that all of the tracks of the new standard logical device are indirect, so that tracks will be migrated from both the global memory and the standard logical device that was previously associated with the virtual device that is being restored. However, just as with the embodiment of FIG. 18, free tracks of the global memory will be returned to the free list and writes to indirect tracks may cause the track to be copied to resolve the indirection. In other embodiments, writes to an indirect track of the global memory may cause the write to be executed directly to the global memory track. Following step 586, processing is complete.

If it is determined at the test step 583 that there are more tracks to be processed, then control transfers from the step 583 to a test step 588, where it is determined if the track (table) of the virtual device points to the standard logical device. If so, then control transfers to a test step 589, where it is determined if the protection bit is set for the track. In accordance with the other processing discussed herein, it is expected that the protection bit would be set of the virtual device points to the standard logical device. Accordingly, if it determined at the step 589 that the protection bit is not set, then control transfers from the step 589 to a step 591 where an error processing is provided in a manner similar to that discussed above in connection with the step 568. In some embodiments, the processing at the step 591 includes setting the protection bit to the correct value. If it is determined at the step 589 that the protection bit for the standard logical device is set, or following the step 591, control transfers to a step 592, where the track of the new standard logical device is set to be an indirect pointer to the track of the old standard logical device (i.e., the standard logical device previously established to the virtual device being restored).

If it is determined at the test step 588, that the track (table) of the virtual device does not point to the standard logical device, control transfers to a test step 593, where it is determined if the protection bit is set for the track. In accordance with the other processing discussed herein, it is expected that the protection bit would not be set if the virtual device does not point to the standard logical device (i.e., points to the global memory). Accordingly, if it determined at the step 593 that the protection bit is set, then control transfers from the step 593 to the step 591, discussed above. If it is determined at the step 593 that the protection bit for the standard logical device is not set, or following the step 591, control transfers to a step 595, where the track of the new standard logical device is set to be an indirect pointer to the corresponding track (cache slot) of the global memory.

Following the step 592 or the step 595 is a step 598 to process the next track of the virtual device. Following the step 598, control transfer back to the step 583, discussed above.

As mentioned above, the protection bits corresponding to the restored virtual device session are not cleared in the embodiment illustrated by FIG. 19. This may be explained with reference to FIGS. 17A and 17C. First, note that some of the tracks of the standard logical device 532 may never have been written to after the virtual device 534 was established, and thus those tracks remain in their original state on the standard logical device 532. When the virtual device 534 is first restored to the new standard logical device 538 as shown in FIG. 17C, those tracks of the standard logical device 532 are indirectly pointed to by corresponding tracks of the standard logical device 538. If a subsequent write to one of those tracks on the standard logical device 532 were to occur prior to the track being copied to the standard logical device 538, then the standard logical device 538, with an indirect reference to the newly written track on the standard logical device 532, would no longer correspond to a restored version of the virtual device 534. However, the set protection bit for the track prevents this. After a restore such as that illustrated in FIG. 17C is performed, a write to a track of the standard logical device 532 having a set protection bit causes the track to first be copied to the standard logical device 538 before the write occurs. Note that, the protection bit for each track may be cleared after each track is copied from the standard logical device 532 to the standard logical device 538, irrespective of whether the copy occurred in connection with the special process caused by the set protection bit or by track migration initiated at the step 588. Thus, once all of the data has been migrated from the standard logical device 532 to the standard logical device 538, all of the protection bits associated with the session are expected to be clear.

Figure 20:
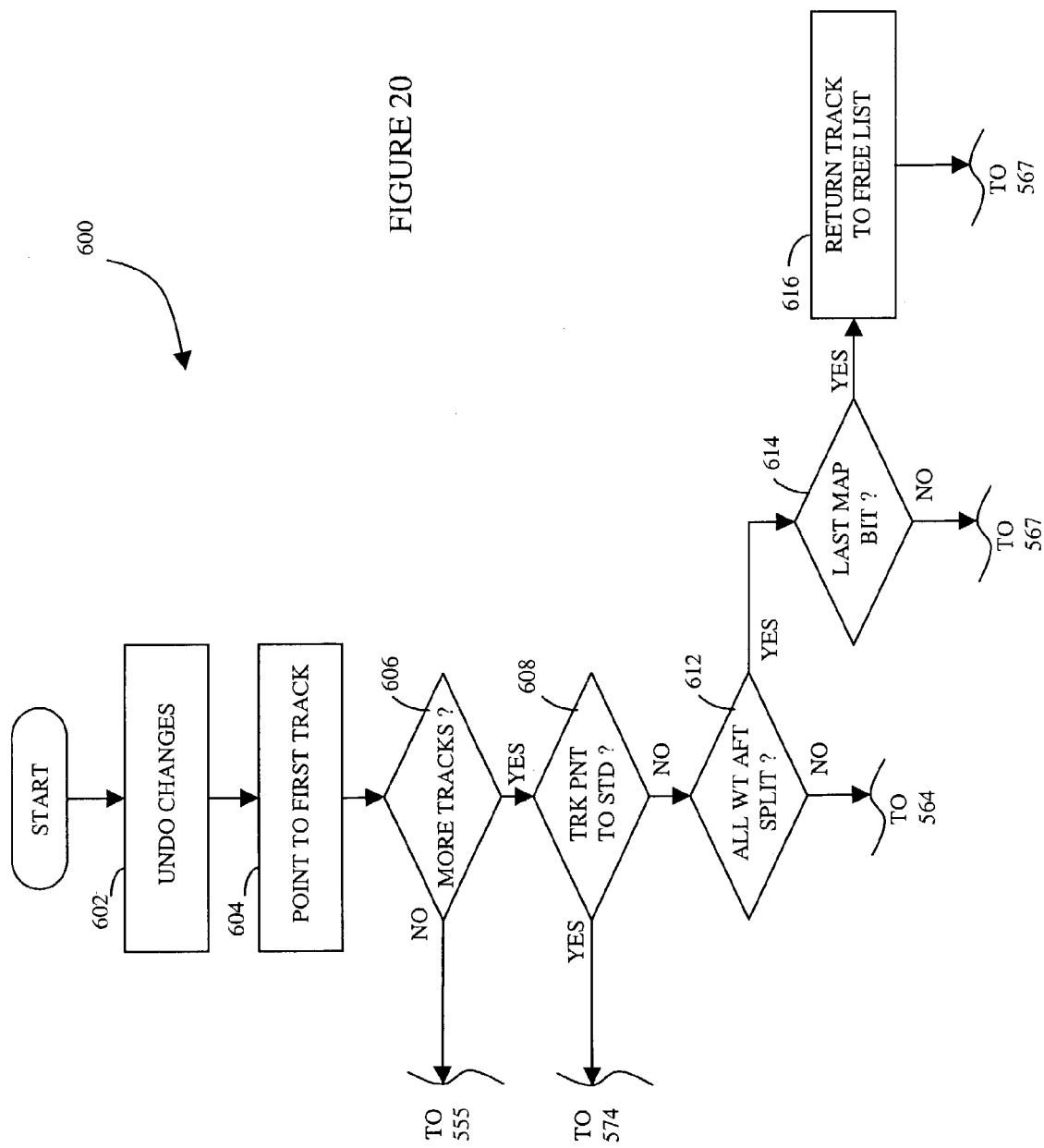
FIG. 20 is a flow chart that illustrates steps performed to restore a virtual logical device to a split mirror standard logical device according to a third embodiment of the system described herein.

Referring to FIG. 20, a partial flow chart 600 illustrates steps performed to restore a virtual device to a mirror logical device, as illustrated above in connection with FIG. 17D. The flow chart 600 illustrates steps performed that are different from those of the flow chart 550 of FIG. 18. Portions of the flow chart 600 which interface and flow into the flow chart 550 (i.e., where the same operations are performed) are shown in FIG. 20 and described herein.

Processing begins at a first step 602 where all changes (e.g., writes) performed on the mirror logical device since the split operation occurred are undone, rendering the mirror logical device substantially identical to the standard logical device at a point in time just prior to the split. For embodiments disclosed herein, a split may occur after the virtual device is established to the standard logical device but before the virtual device is restored. The ability to undo the changes since the split may be provided by the mirror facility that uses feature tracking to log and track the changes that occurred since the split.

Following the step 602 is a step 604, which is like the step 552 of FIG. 18 where a pointer is set to point to the first track of the virtual device. Following the step 604 is a test step 606, which is like the test step 554 of FIG. 18, where it is determined if there are more tracks to be processed. If not, then control transfers to the step 555 of FIG. 18, discussed above. Otherwise, control transfers to a test step 608, which is like the step 562 of FIG. 18, where it is determined if the pointer of the virtual device points to the standard logical device. If so, then control transfers to the step 574 of FIG. 18, discussed above.

If it is determined at the step 608 that the track of the virtual device being processed does not point to the standard logical device (indicating at least one write was performed after the virtual device was established), then control transfers from the step 608 to a step 612, where it is determined if all of the write operations to the track being processed occurred after the mirror logical device was split from the standard logical device. Note that if this is the case, the undo operation at the step 602 will have restored the track of the mirror logical device to the same state as the corresponding track of the standard logical device prior to the virtual device being established.

If it is determined that all writes to the track did not occur after the split, then control transfers from the step 608 to the step 564 of FIG. 18, discussed above, to cause the corresponding track of the mirror logical device to indirectly point to the appropriate track (cache slot) of the global memory in a manner similar to that discussed above in connection with FIG. 18. If it is determined at the test step 612 that all writes occurred after the split, then control transfers from the step 612 to a test step 614, where it is determined if the virtual device is the last virtual device (i.e., the only virtual device) pointing to the corresponding track of the global memory. If so, then control transfers from the step 614 to a step 616 where the track (cache slot) of the global memory is released. The steps 614, 616 are analogous to the steps 386, 388 of FIG. 11, discussed above. Following the step 616, or following the step 614 if the track (cache slot) of the global memory is being used by more than one virtual device (or some other process), is the step 567 of FIG. 18, which tests if the protection bit is in the proper state and then clears the protection bit. In this instance, however, the protection bit on both the standard logical device 532 and the mirror logical device 532' are cleared. Note that transferring to the step 567 causes the track of the mirror logical device to be a direct track for accessing data.

It is useful for host applications that access the storage device to be able to use some of the functionality described herein. For example, a host application may want to create a virtual device to represent a point in time copy of a standard logical device and then run a backup from the virtual device, after which, the virtual device may be deallocated. In other instances, the virtual device may be used to maintain a point in time copy of the data from the standard logical device when software that uses the standard logical device is tested. After the testing period, the point in time copy represented by the virtual device may be restored back in the standard logical device.

Figure 21:
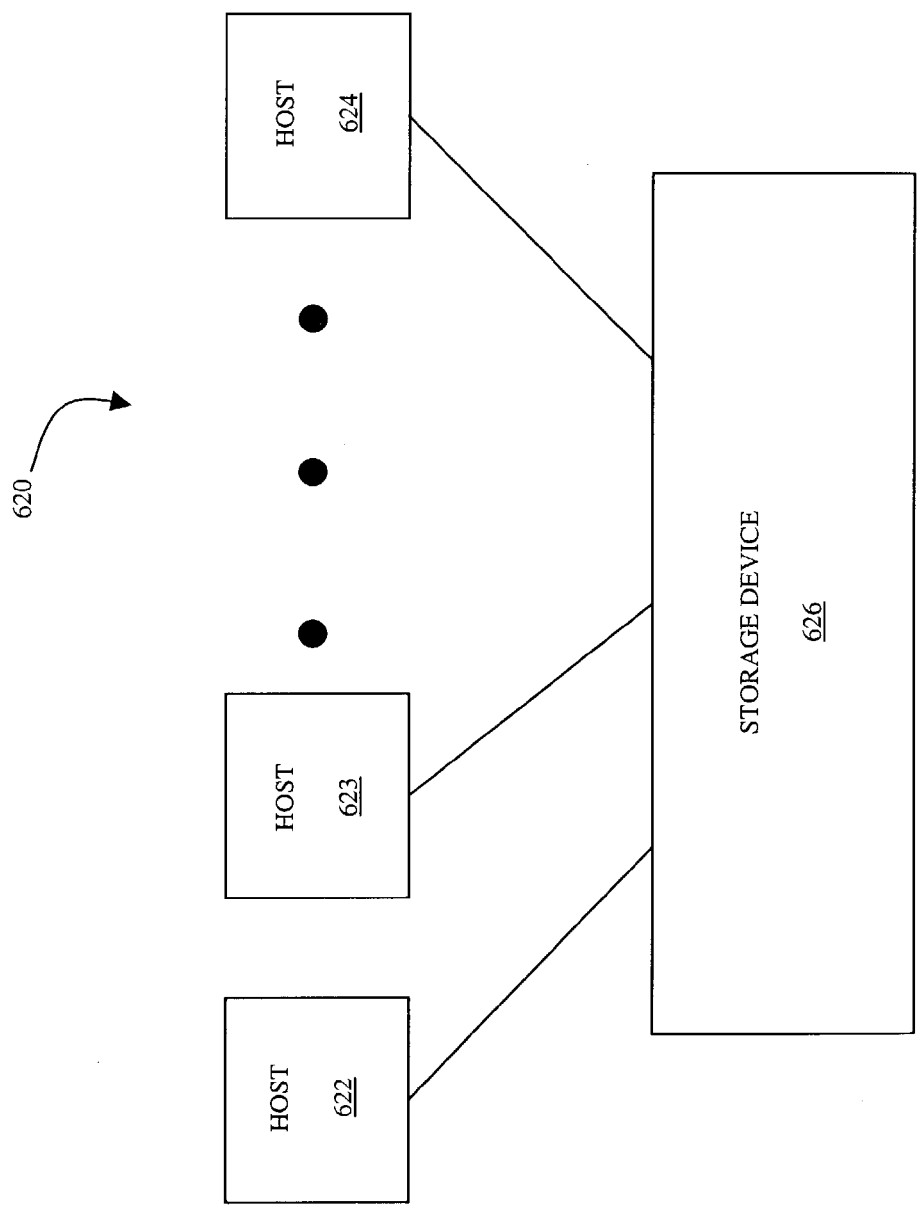
FIG. 21 is a flow chart illustrating interconnects between hosts and a storage device according to the system described herein.

Referring to FIG. 21, a diagram 620 illustrates a plurality of hosts 622–624 that access the storage device 626. Each of the hosts 622–624 may create, establish, deallocate, and restore standard logical device/virtual device pairs as described herein by making system calls to the storage device 626. In an embodiment disclosed herein, applications running on the hosts 622–624 would not directly make the system calls. Rather, an underlying layer of software translates higher level calls from the hosts 622–624 into the appropriate system calls that are provided to the storage device 626. For example, the host 622 may have an application that establishes a standard logical device/virtual device pair by calling an Establish routine that will ultimately cause the appropriate system calls (e.g., Register, Relate, and Activate) to be called using, for example, a library linked to the application running on the host 622, an operating system routine that runs on the host 622, or some other appropriate mechanism.

The parameters passed to the Establish routine may include one or more standard logical device/virtual device pairs as well as one or more optional name change parameters (discussed above) and one or more online/offline indicators that determine whether a newly-established virtual device will be on line or off line as discussed above. In some embodiments, an Establish routine called from an application will only accept one standard logical device/ virtual device pair. In other embodiments, an Establish routine will accept multiple standard logical device/virtual device pairs (e.g., a list or list id as discussed above). In embodiments that accept multiple standard logical device/ virtual device pairs, the underlying system calls may or may not cause the virtual devices to be established synchronously in the manner discussed elsewhere herein. In some cases, it may be possible for a host to handle synchronously establish multiple standard logical device/virtual device pairs by, for example, using the mechanism disclosed in U.S. patent application Ser. No. 10/134,420 U.S. Pat. No. 6,983,353 filed on Apr. 29, 2002, which is incorporated herein by reference, to establish appropriate consistency groups to cause synchronization of the activate operation. In addition, it may be possible to synchronously establish a plurality of pairs by the host simply waiting for all pairs to be established before performing operations on any of the devices that are part of the pairs. In some embodiments, the Establish routine may be passed one or more standard logical devices and corresponding virtual devices that are created and/or obtained by the establish routine.

Figure 22:
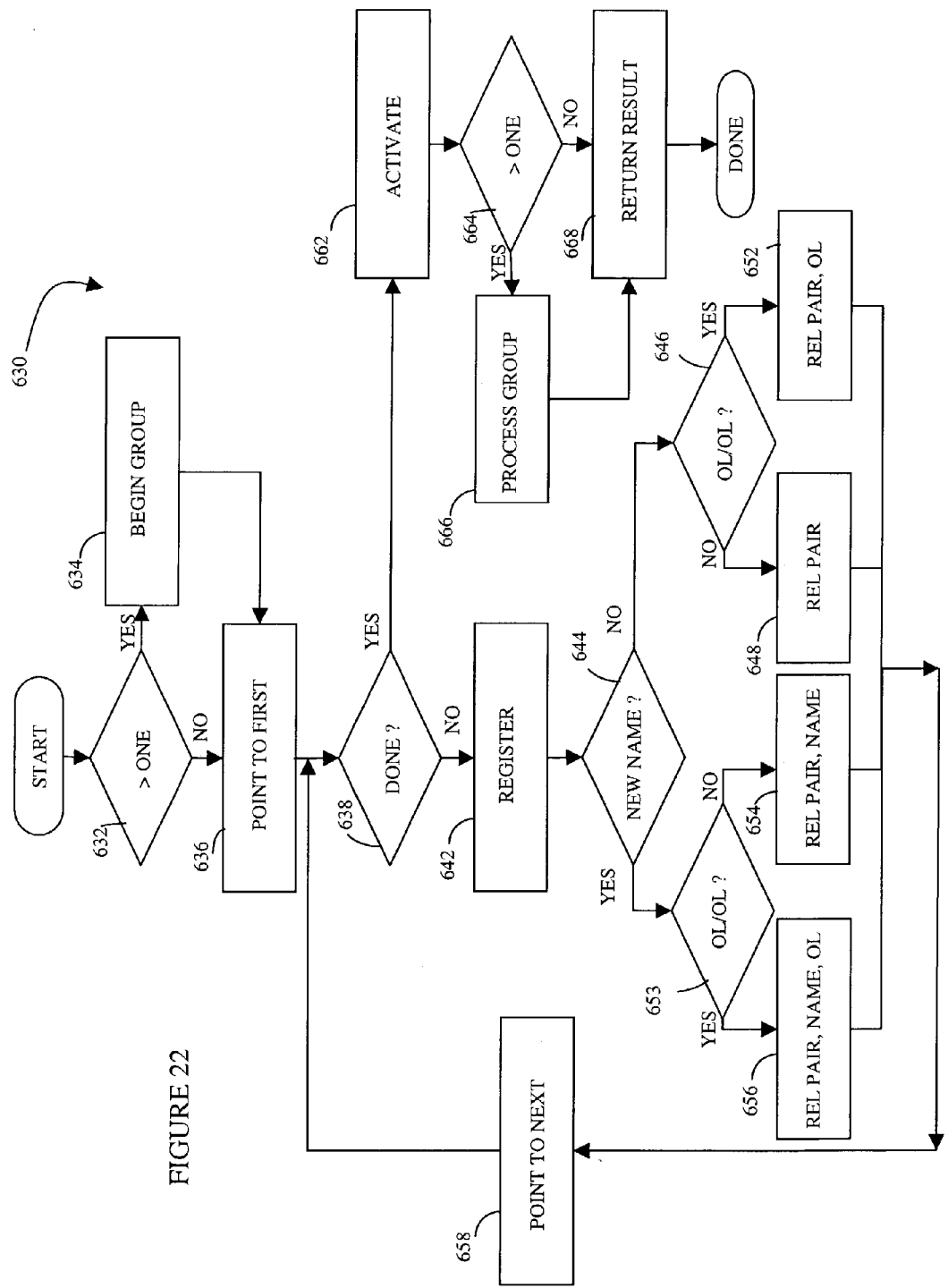
FIG. 22 is a flow chart illustrating a host application call to establish a standard logical device/virtual device pair according to the system described herein.

Referring to FIG. 22, a flow chart 630 illustrates steps performed by an Establish routine that translates a higher level application call for establishing one or more standard logical device/virtual device pairs into appropriate system calls that can be made to the storage device 626. The translation may be performed in library code linked to the application itself, by the operating system on one of the host devices 622–624, or by using any other appropriate mechanism that translates high level host application calls to system calls.

Processing begins at a first step 632 where it is determined if more than one standard logical device/virtual device pair is being established. As discussed above, it is possible in some embodiments to establish more then one standard logical device/virtual device pair in a single call and, in some embodiments, in a way that causes all of the virtual devices to be activated synchronously. If it is determined at the test step 632 that more than one standard logical device/ virtual device pair is being established, then control passes from the step 632 to a step 634 where a Begin Group call is performed to create the list of standard logical device/virtual device pairs discussed above. Note that it is possible to synchronously process and establish multiple standard logical device/virtual device pairs without using Begin Group and Process Group, as described above. In those cases, another appropriate mechanism, such as one or more of those discussed above (e.g., lists, list ids), may be invoked at the step 634 to cause multiple standard logical device/virtual device pairs to be established simultaneously. Alternatively still, it may be possible to establish appropriate consistency groups as described in U.S. patent application Ser. No. 10/134,420 U.S. Pat. No. 6,983,353, referenced above and use the consistency group mechanisms to activate multiple pairs synchronously.

If it is determined at the step 632 that only one standard logical device/virtual device pair is to be established, or following the step 634, is step 636 where the first standard logical device/virtual device pair is pointed to in order to facilitate processing thereof. In some embodiments, each standard logical device/virtual device pair is stored in a data structure (containing possibly other optional parameters, such as a new name and/or an online/offline specifier). The data structures may be linked together in a linked list. Thus, the pointer set at the step 636 and used for follow on processing is provided to traverse the list. In embodiments where the Establish routine creates or otherwise provides corresponding virtual device(s), data location(s) may be passed to the Establish routine, which places one or more appropriate virtual device identifiers in the location(s).

Following step 636 is the step 638 which determines if processing of the list of passed parameters is complete (e.g., if the pointer points to the end of the list). Of course, on the first iteration, the result of the test of the step 638 are expected to indicate that processing is not complete. If it is determined at the test step 638 that not all of the standard logical device/virtual device pairs (or, in some embodiments, just standard logical devices) have been processed, then control transfer from the step 638 to a step 642 to invoke the Register routine, discussed above.

Following the step 642 is a test step 644 where it is determined if an optional new name has been specified. If it is determined at the test step 644 that an optional new name has not been provided, then control transfers from the step 644 to a test step 646 which determines if an optional online/offline boolean parameter has been provided. As discussed above, the online/offline option allows the calling routine to determine whether the virtual device that is being established will be online (become available to the host) or offline (not available to the host) upon being established. If it is determined at the test step 646 that an online/offline parameters is not being provided, then control passes from the test step 646 to a step 648 where a Relate system call is provided to relate the standard logical device/virtual device pair.

If it is determined at the test step 646 that an optional online/offline parameter has been provided, then control transfers from the step 646 to a step 652 where the Relate system call is made. However, at the step 652, the online/offline parameters may also be passed by the system call to indicate whether the virtual device should be made online or offline at the time of establishment.

If it is determined at the test step 644 that a new name for the virtual device has been provided, then control transfers from the step 644 to a step 653 where it is determined if an optional online/offline parameter has been provided. If it is determined at the test step 655 that an optional online/offline parameters is not being provided, then control transfers from the step 653 to a step 654 to provide a system call to Relate the pair along with the new name parameter, as discussed above.

If it is determined at the test step 653 that an optional online/offline parameter has been provided in connection with the standard logical device/virtual device pair, then control transfers from the step 653 to a step 656 where the pair is related along with the new name for the virtual device and with an indication of whether the virtual device will be online or offline upon establishment.

Following each of the steps 648, 652, 654, 656, is a step 658 where the pointer set at the step 636 is made to point to the next standard logical device/virtual device pair, if any. Following step 658, control transfers back to the test up 638 to determine if all of the standard logical device/virtual device pairs have been processed.

If it is determined at the test step 638 that all the standard logical devices/virtual device pairs have been processed, than control transfers from the step 638 to a step 662 where an Activate system call is provided for each of the pairs (or, for different embodiments discussed above, Activate may be called for all of the pairs). Following step 662 is a step 664 where it is determined if there is more than one standard logical device/virtual device pair. If so, then controlled transfers from the step 664 to a step 666 where a Process Group call is made. Just as with the step 634 where Begin Group has been called, the step 666 may represent another mechanism to synchronously establish multiple standard logical device/virtual device pairs. In some embodiments, the routine performing the processing illustrated by the flow chart 630 keeps track of a list of standard logical device/virtual device pairs, in which case the entire list (or a list id, as discussed above) may be passed to the Activate routine, as discussed above. In other embodiments, a consistency group is formed, as described in U.S. Pat. Ser. No. 10/134, 420, mentioned above.

Following the step 666 or following the step 664 if there is only one standard logical device/virtual device pair, is a step 668 where the result of performing the processing set forth in the previous steps is returned to the calling routine (e.g., success or failure and, in some embodiments, identifiers for the newly established virtual devices). Following the step 668, processing is complete.

It is also possible to provide a Restore routine that is called from an application at one of the hosts 622–624 where the Restore routine takes, as parameters, one or more standard logical device/virtual device pairs as well as optional names for renaming the standard logical device(s) to which the virtual devices(s) are restored and optional online/offline boolean values indicating whether the standard logical device(s) will be online or offline. The parameters may be passed in a linked list in a manner similar to that discussed above in connection with the Establish routine. Note also that, in the case of the Restore routine, the standard logical device of a standard logical device/virtual device pair may be the same standard logical device to which the virtual device was established or could be a different standard logical device or a mirror logical device, as discussed above. Also as discussed above, a virtual device may be restored to another virtual device.

Figure 23:
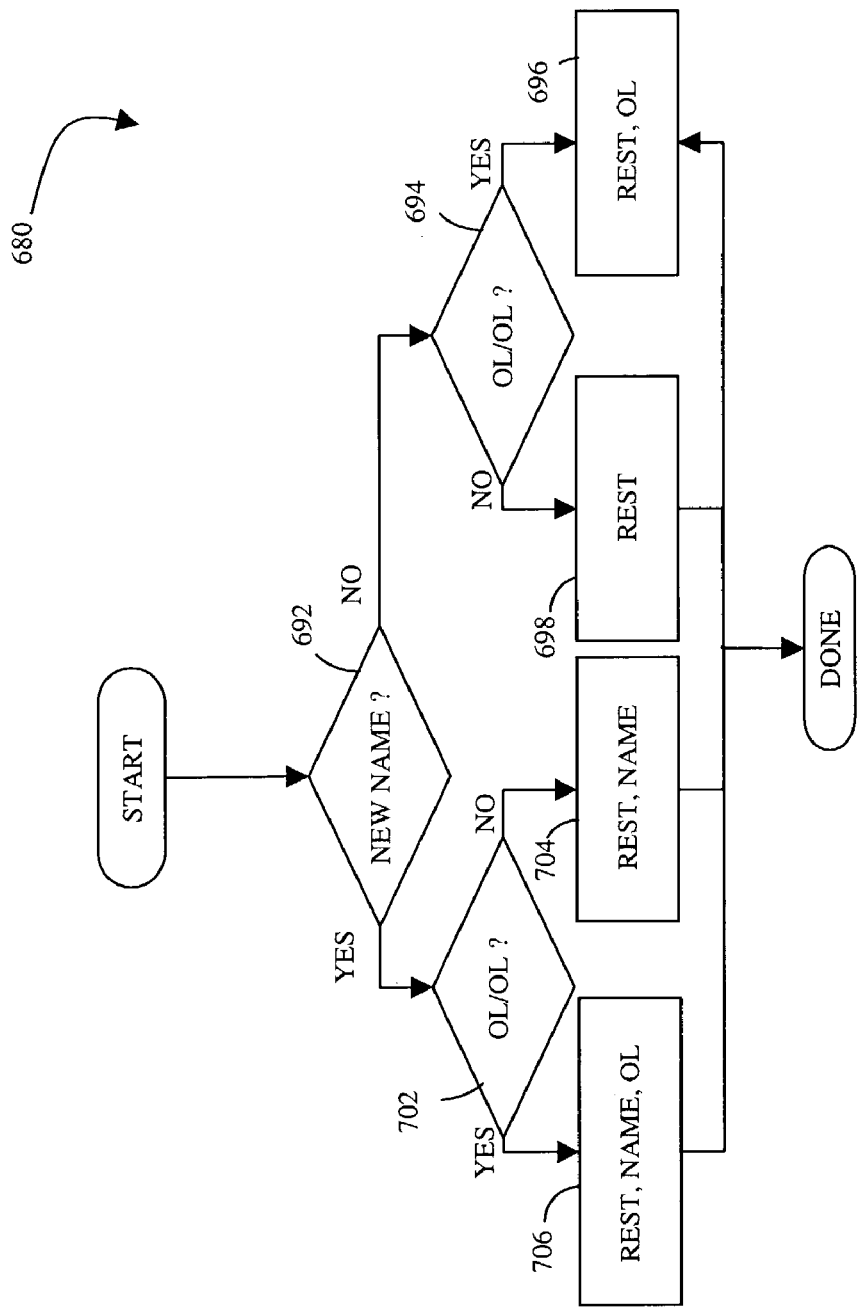
FIG. 23 is a flow chart illustrating a host application call to restore a virtual device to a standard logical device according to the system described herein.
Figure 24:
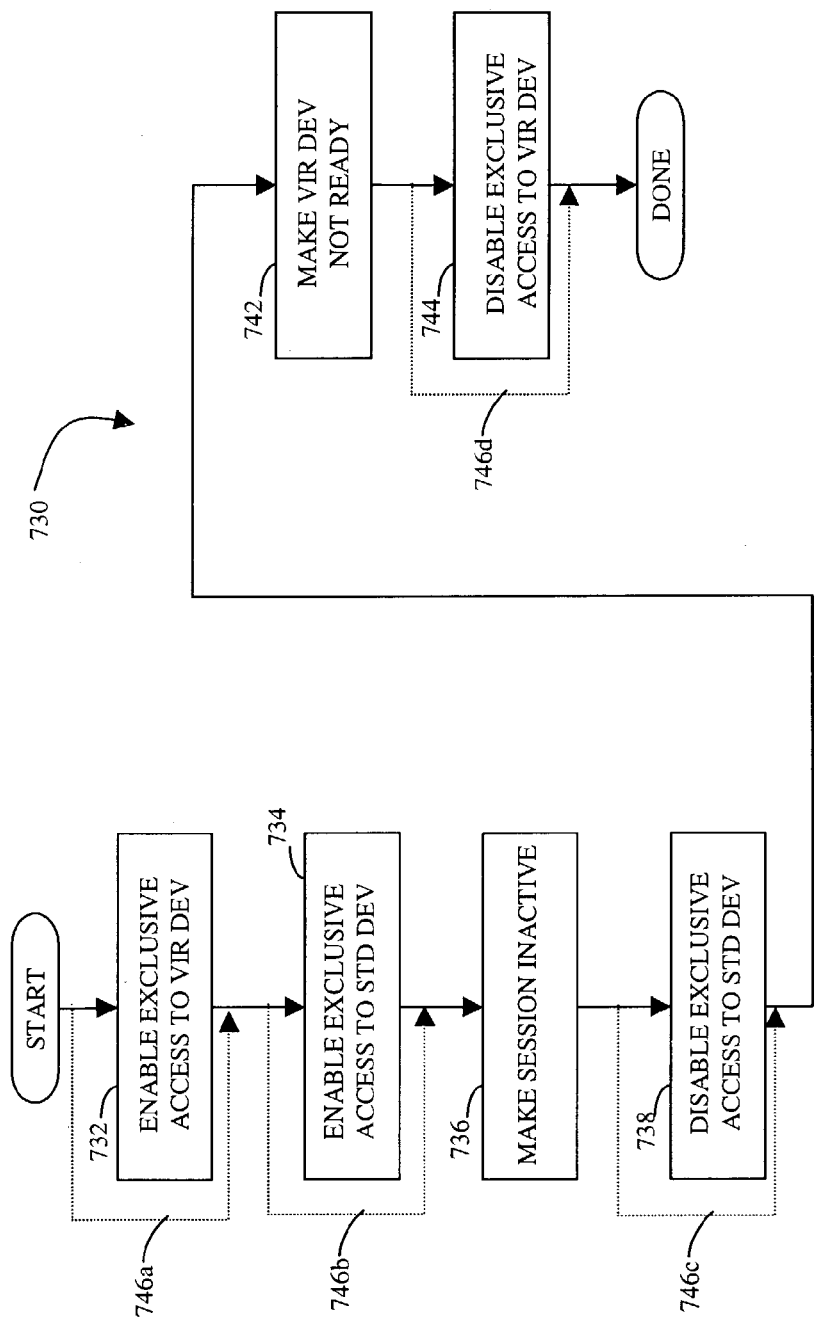
FIG. 24 is a flow chart illustrating deactivating a virtual device according to the system described herein.

Referring to FIG. 23, a flow chart 680 illustrates steps performed in connection with a host application calling a Restore routine to restore a virtual device as illustrated in FIGS. 17B, 17C, 17D, 17E. Processing begins at a first step 692 where it is determined if an optional new name has been provided as a parameter to the Restore routine. As discussed above, in some instances it is possible to restore a virtual device to a standard logical device or to a new virtual device and, at the same time, provide the standard logical device or new virtual device with a different name than that associated with the old virtual device. If it is determined at the test step 692 that a new name has not been provided, then control transfers from the step 692 to a test step 694 where it is determined if an optional online/offline parameter has been provided. As discussed above, in some instances it is possible to restore a virtual device to a standard logical device or new virtual device while, at the same time, making the standard logical device or new virtual device not available to the host (offline).

If it is determined at the test step 694 that an optional online/offline parameter has not been provided, then control transfers from the step 694 to a step 696 where the virtual device is restored by making a Restore system call, as discussed above. Alternatively, if it is determined at the test step 694 that an optional online/offline parameter has been provided, then control transfers from the test step 694 to a step 698 where a Restore system call is provided with the optional online/offline parameter.

If it is determined at the test step 692 that a new name has been provided to the Restore routine, then control transfers from the step 692 to a test step 702 where it is determined if an optional online/offline parameter has also been provided. If not, then control transfers from the test step 702 to a step 704 where a Restore system call is provided, along with the new name of the standard logical device or new virtual device, to restore the virtual device. If it is determined that the test step 702 that an optional online/offline parameter has been provided, then control transfers from the test step 702 to a step 706 where a Restore system call is performed with the new name and online/offline parameter. Following any of the steps 696, 698, 704, 706, processing is complete.

While the invention herein has, in some cases, been illustrated using the global memory 46 of the storage device 30 tracks of data using, in some instances, a cache slot mechanism, it will be appreciated by one of ordinary skill in the art that any volatile memory (relatively fast memory) may be used with or without the cache slot mechanism. In any event, the volatile memory may be separate and independent of any disk storage area and/or may be independent of a standard logical device to which the virtual device is associated. Similarly, it may be appreciated by one of ordinary skill in the art that the system described herein may be combined with other systems that store at least some tracks of data on a disk, so that some of the tracks of data are stored in a volatile memory (e.g., the global memory 46) while some of the tracks of data are stored on one or more disks (or other memory).

While the invention has been disclosed in connection with various embodiments, modifications thereon will be readily apparent to those skilled in the art. Accordingly, the spirit and scope of the invention is set forth in the following claims.

What is claimed is:

1. A method of accessing stored data, comprising:
   providing a virtual storage area having a table of pointers that point to one of: a disk storage area and a volatile memory area, wherein the virtual storage area contains no sections of data;
   causing all of the pointers of the table to initially point to sections of the disk storage area when the virtual storage area is initially associated with the disk storage area;
   in response to a request for accessing data of the virtual storage area, determining whether a corresponding one of the pointers points to the disk storage area or points to the volatile storage area;
   accessing the data from the disk storage area or from the volatile storage area;
   associating a first one of the other storage areas with the virtual storage area, wherein the virtual storage area represents a copy of data of the disk storage area; and
   in response to a write to a first section on the disk storage area, copying data of the first section to a second section that is part of the volatile storage area and causing a corresponding one of the pointers of the table to point to the second section.

2. A method, according to claim 1, further comprising:
   associating a data indicator with sections of the disk storage area, wherein the data indicator for a particular section indicates whether a write operation has been performed to the particular section after the disk storage area has been associated with the virtual storage area.

3. A method, according to claim 2, further comprising:
   in response to a write to a first section on the disk storage area and the data indicator indicating that no write operation has been performed to the first section after the disk storage area has been associated with the virtual storage area, copying data of the first section to a second section that is part of the volatile memory and causing a corresponding one of the pointers of the table to point to the second section.

4. A method, according to claim 3, further comprising:
   following copying the data from the first section to the second section, sending status information to a device that caused the write operation to be performed.

5. A method, according to claim 1, wherein each of the sections of data is a track of data.

6. A method, according to claim 1, wherein the disk storage areas is a storage device.

7. A method, according to claim 1, wherein the volatile memory is a cache.

8. A method, according to claim 7, further comprising:
   the disk storage area sharing use of the cache with the virtual storage area.

9. A computer program product implemented in a computer storage device in which program instructions are stored, wherein the instructions causes computer implemented operations to be performed, the operations comprising:
   executable code that provides a virtual storage area having a table of pointers that point to one of: a disk storage area and a volatile memory area, wherein the virtual storage area contains no sections of data;
   executable code that determines which particular one of the areas contain the data in response to a request for accessing data of the virtual storage area;
   executable code that accesses the data on the particular one of the areas using the table of pointers;
   executable code that associates the disk storage area with the virtual storage area, wherein the virtual storage area represents a copy of data of the disk storage area;
   executable code that causes all of the pointers of the table to initially point to sections of the disk storage area when the virtual storage area is initially associated with the disk storage area; and
   executable code that copies data of the first section to a second section of the volatile memory area and causes a corresponding one of the pointers of the table to point to the second section in response to a write to the first section.

10. A computer program product, according to claim 9, further comprising:
    executable code that associates a data indicator with sections of the disk storage area, wherein the data indicator for a particular section indicates whether a write operation has been performed to the particular section after the disk storage area has been associated with the virtual storage area.

11. A computer program product, according to claim 10, further comprising:
executable code that copies data of the first section to a second section that is on the volatile memory area and causes a corresponding one of the pointers of the table to point to the second section in response to a write to a first section on the disk storage area and the data indicator indicating that no write operation has been performed to the first section after the disk storage area has been associated with the virtual storage area.

12. A computer program product, according to claim 11, further comprising:
executable code that sends status information to a device that caused the write operation to be performed following copying the data from the first section to the second section.

13. A computer program product, according to claim 9, wherein each of the sections of data is a track of data.

14. A computer program product, according to claim 9, wherein the disk storage area is a storage device.

15. A computer program product, according to claim 9, wherein the volatile memory storage area is a cache.

16. A computer program product, according to claim 15, further comprising:
executable code that causes the disk storage area to share the cache with the virtual storage area.

* * * * *